US 12,245,153 B2

United States Patent
Elshafie et al.

(10) Patent No.: US 12,245,153 B2
(45) Date of Patent: Mar. 4, 2025

(54) WAKE UP RADIO AND WAKEUP SIGNALING

(71) Applicant: QUALCOMM Incorporated, San Diego, CA (US)

(72) Inventors: Ahmed Elshafie, San Diego, CA (US); Hung Dinh Ly, San Diego, CA (US); Yuchul Kim, San Diego, CA (US); Paul McAdams, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/933,047

(22) Filed: Sep. 16, 2022

(65) Prior Publication Data

US 2024/0098642 A1 Mar. 21, 2024

(51) Int. Cl.
*H04W 52/02* (2009.01)
*H04L 5/00* (2006.01)
(52) U.S. Cl.
CPC ....... *H04W 52/0235* (2013.01); *H04L 5/0048* (2013.01)
(58) Field of Classification Search
CPC ......... H04W 52/0235; H04W 52/0216; H04W 52/0229; H04L 5/0048; Y02D 30/70
See application file for complete search history.

(56) References Cited

U.S. PATENT DOCUMENTS

2023/0269666 A1* 8/2023 Wu .................. H04W 52/0235
                                                              370/311
2024/0007950 A1* 1/2024 Liao ................. H04W 52/0212

* cited by examiner

*Primary Examiner* — Ayanah S George
(74) *Attorney, Agent, or Firm* — Paul M. McAdams; Polsinelli LLP

(57) ABSTRACT

Apparatus, methods, and computer program products for wireless communication are provided. An example method may include receiving, from a second network entity, one or more LP reference signal (LP RS) resources, where the one or more LP RS resources are configured for at least one of: time or frequency tracking or synchronization, time or frequency error estimation or correction, radio resource management (RRM), or channel estimation. The example method may further include receiving a LP wake up signal (LP WUS) based on the one or more LP RS resources, where the LP WUS is associated with one or more monitoring occasions, where the LP WUS is quasi-co-located with at least one of the one or more LP RS resources, and where the LP WUS is associated with a first configuration and the at least one LP RS resource is associated with a second configuration.

37 Claims, 14 Drawing Sheets

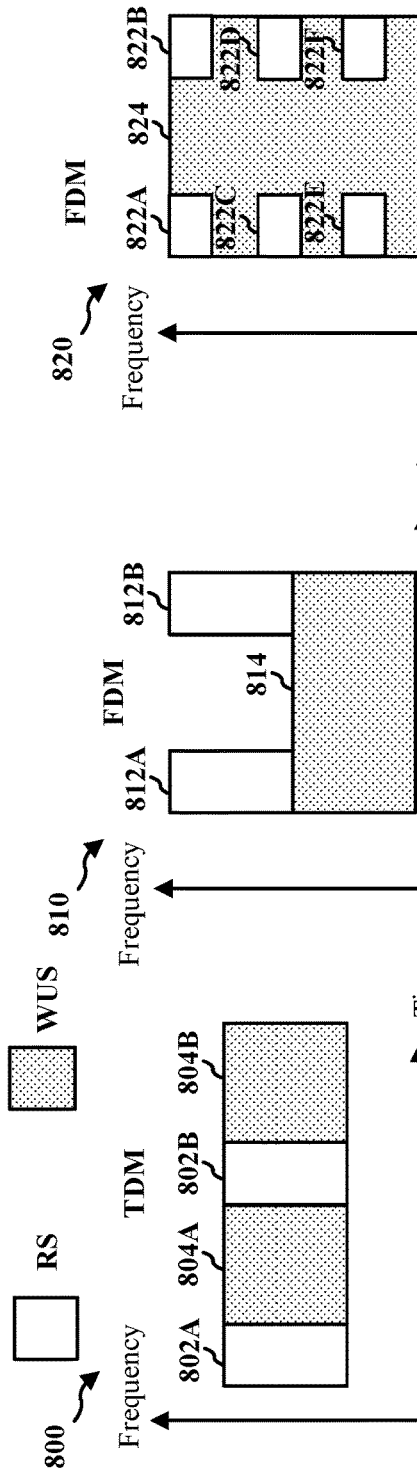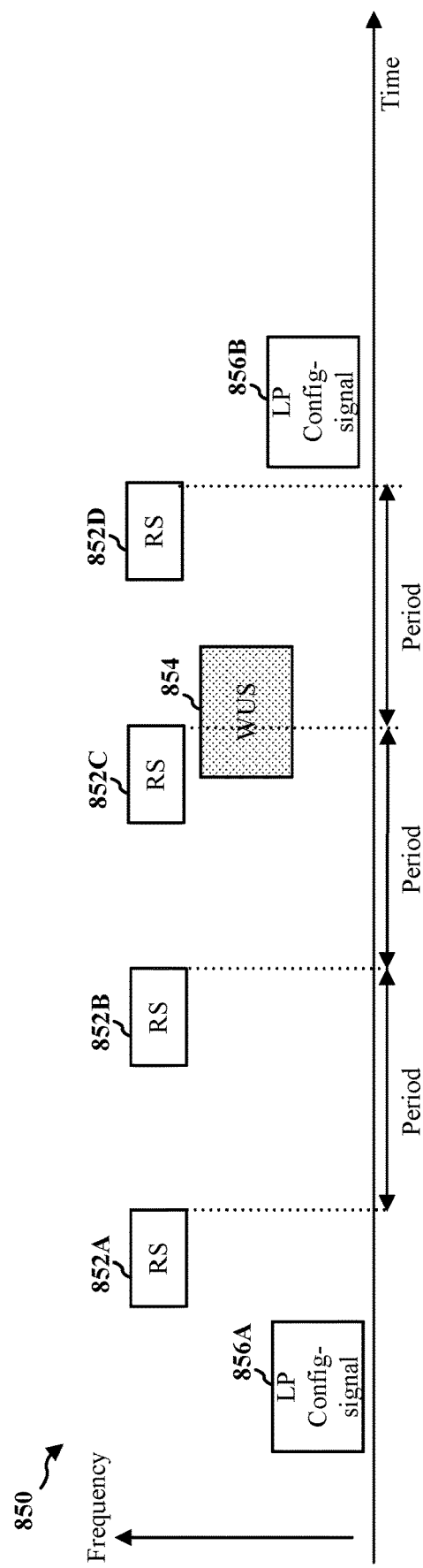

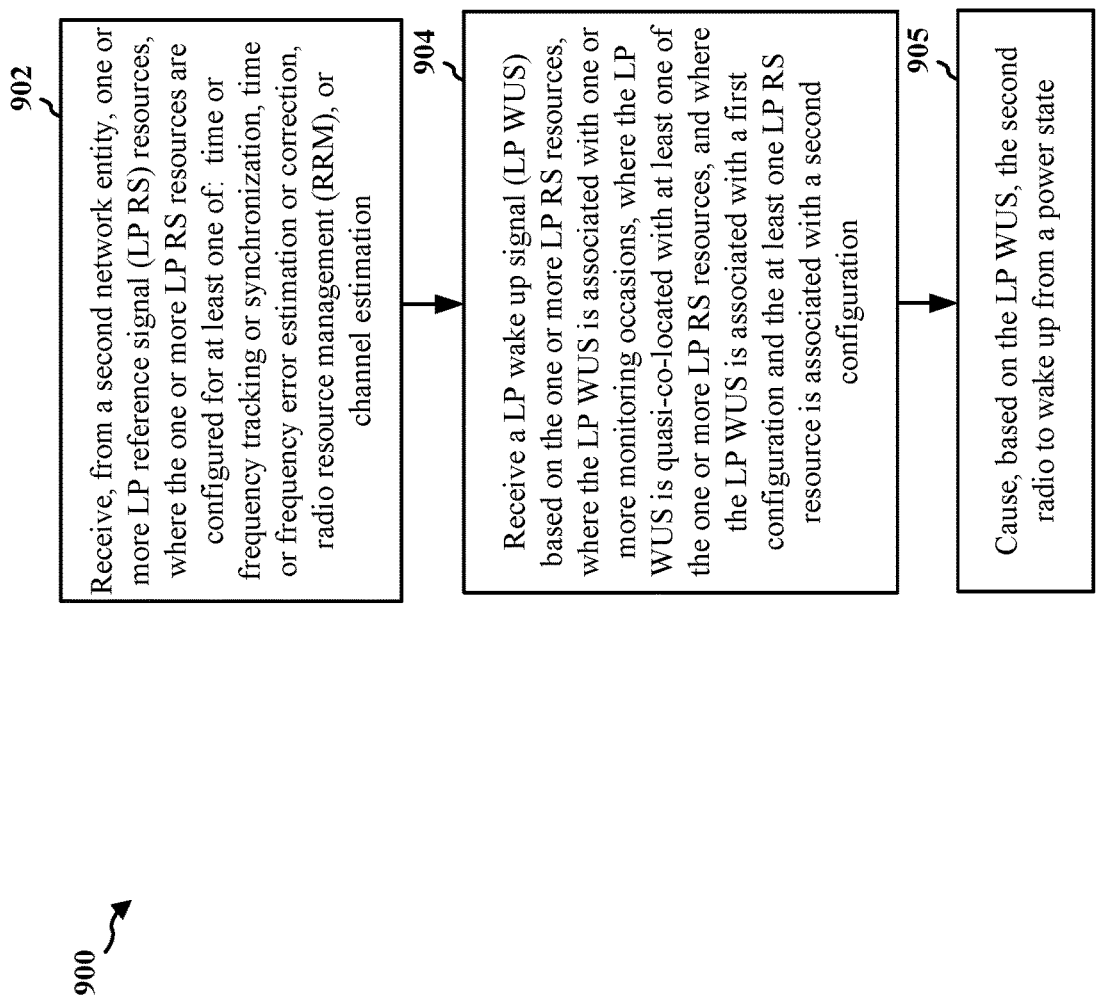

WAKE UP RADIO AND WAKEUP SIGNALING

TECHNICAL FIELD

The present disclosure relates generally to communication systems, and more particularly, to wireless communication systems with low power wake-up signaling and a first radio configured to wake up a second radio.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first network entity (such as a user equipment (UE)) are provided. The apparatus may include a first radio and a second radio coupled to the first radio. The first radio may be configured to receive, from a second network entity, one or more low power (LP) reference signal (LP RS) resources, where the one or more LP RS resources are configured for at least one of: time or frequency tracking or synchronization, time or frequency error estimation or correction, radio resource management (RRM) (e.g., serving cell or non-serving cell RRM), or channel estimation (e.g., instantaneous channel coefficients or channel impulse response, Doppler shift, Doppler spread, delay spread). The first radio may be configured to receive (e.g., from the second network entity) a LP wake up signal (LP WUS) based on the one or more LP RS resources, where the LP WUS is associated with one or more monitoring occasions, where the LP WUS is quasi-co-located with at least one of the one or more LP RS resources, and where the LP WUS is associated with a first configuration and the at least one LP RS resource is associated with a second configuration. The first radio may be configured to cause, based on the LP WUS, the second radio to wake up from a power state.

In another aspect of the disclosure, a method, a computer-readable medium, and an apparatus at a first network entity (such as a base station) are provided. The apparatus may include a memory and at least one processor coupled to the memory. The at least one processor may be configured to transmit to a second network entity, one or more low power (LP) reference signal (LP RS) resources, where the one or more LP RS resources are configured for at least one of: time or frequency tracking or synchronization, time or frequency error estimation or correction, radio resource management (RRM), or channel estimation. The at least one processor may be configured to transmit, to the second network entity, a LP wake up signal (LP WUS) based on the one or more LP RS resources, where the LP WUS is associated with one or more monitoring occasions of the second network entity, where the LP WUS is quasi-co-located with at least one of the one or more of configured LP RS resources, and where the LP WUS is associated with a first configuration and the at least one LP RS resource is associated with a second configuration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8A is a diagram illustrating example multiplexing of LP WUS and LP RS.

FIG. 8B is a diagram illustrating example multiplexing of LP WUS and LP RS.

FIG. 8C is a diagram illustrating example multiplexing of LP WUS and LP RS.

FIG. 8D is a diagram illustrating example LP configuration signal, LP WUS, and LP RS.

FIG. 9 is a flowchart of a method of wireless communication.

DETAILED DESCRIPTION

Figure 1:
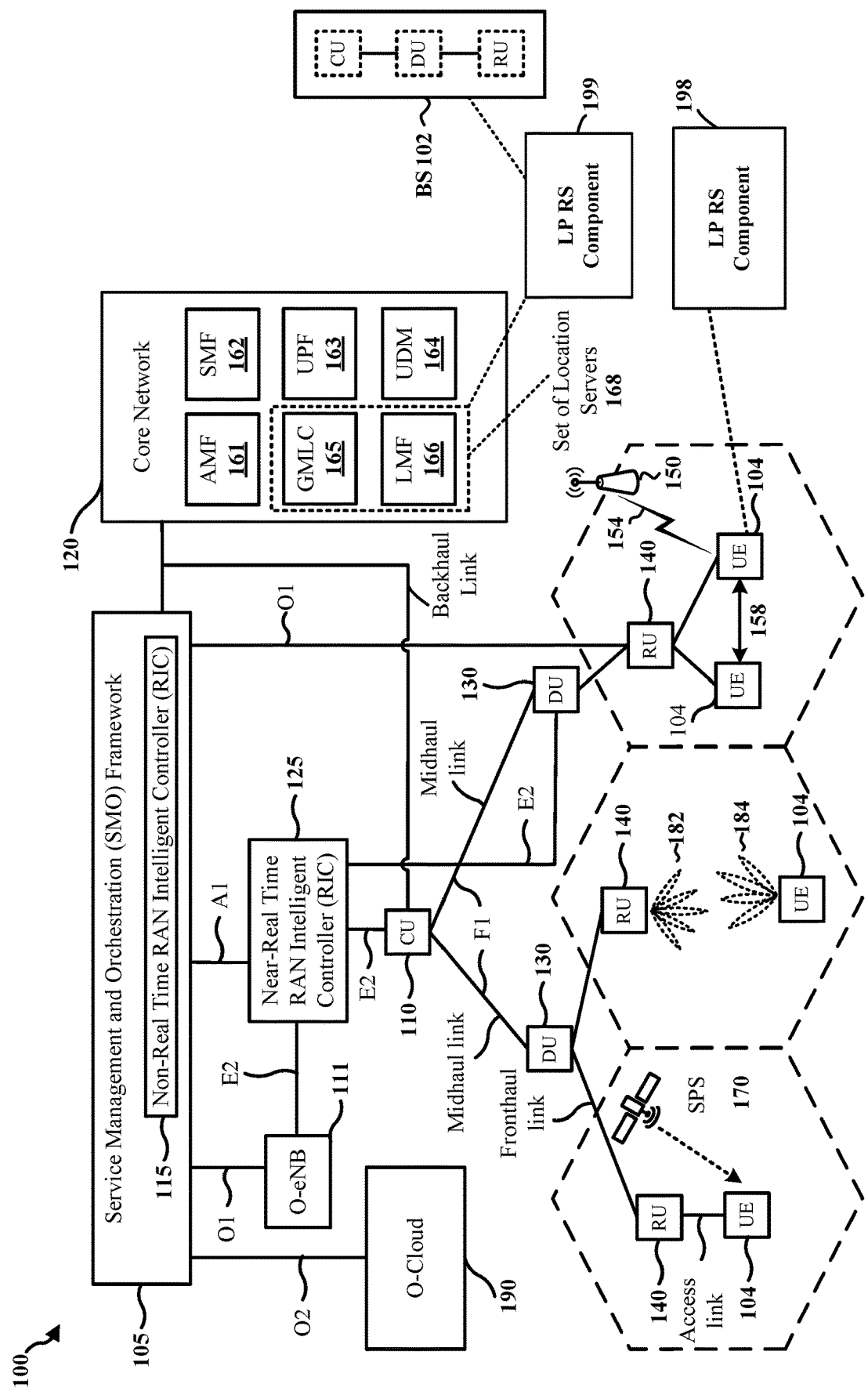
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz).

Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, a first network entity (e.g., the UE 104) may include a LP RS component 198. In some aspects, the LP RS component 198 may be configured to receive, from a second network entity, one or more LP reference signal (LP RS) resources, where the one or more LP RS resources are configured for at least one of: time or frequency tracking or synchronization, time or frequency error estimation or correction, radio resource management (RRM) (e.g., serving cell or non-serving cell RRM), or channel estimation (e.g., instantaneous channel coefficients or channel impulse response, Doppler shift, Doppler spread, delay spread). In some aspects, the LP RS component 198 may be further configured to receive (e.g., from the second network entity) a LP wake up signal (LP WUS) based on the one or more LP RS resources, where the LP WUS is associated with a paging indication, where the LP WUS is quasi-co-located with at least one of the one or more of configured LP RS resources, and where the LP WUS is associated with a first configuration and the at least one LP RS resource is associated with a second configuration. In some aspects, the LP RS component 198 may be further configured to cause, based on the LP WUS, the second radio to wake up from a power state.

In some aspects, the base station 102 may include a LP RS component 199. In some aspects, the LP RS component 199 may be configured to transmit, to a second network entity (e.g., for a first radio of the second network entity), one or more LP reference signal (LP RS) resources, where the one or more LP RS resources are configured for at least one of: time or frequency tracking or synchronization, time or frequency error estimation or correction, radio resource management (RRM), or channel estimation. In some aspects, the LP RS component 199 may be further configured to transmit, to the second network entity, a LP wake up signal (LP WUS) based on the one or more LP RS resources, where the LP WUS is associated with one or more monitoring occasions of the second network entity, where the LP WUS is quasi-co-located with at least one of the one or more of configured LP RS resources, and where the LP WUS is associated with a first configuration and the at least one LP RS resource is associated with a second configuration.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
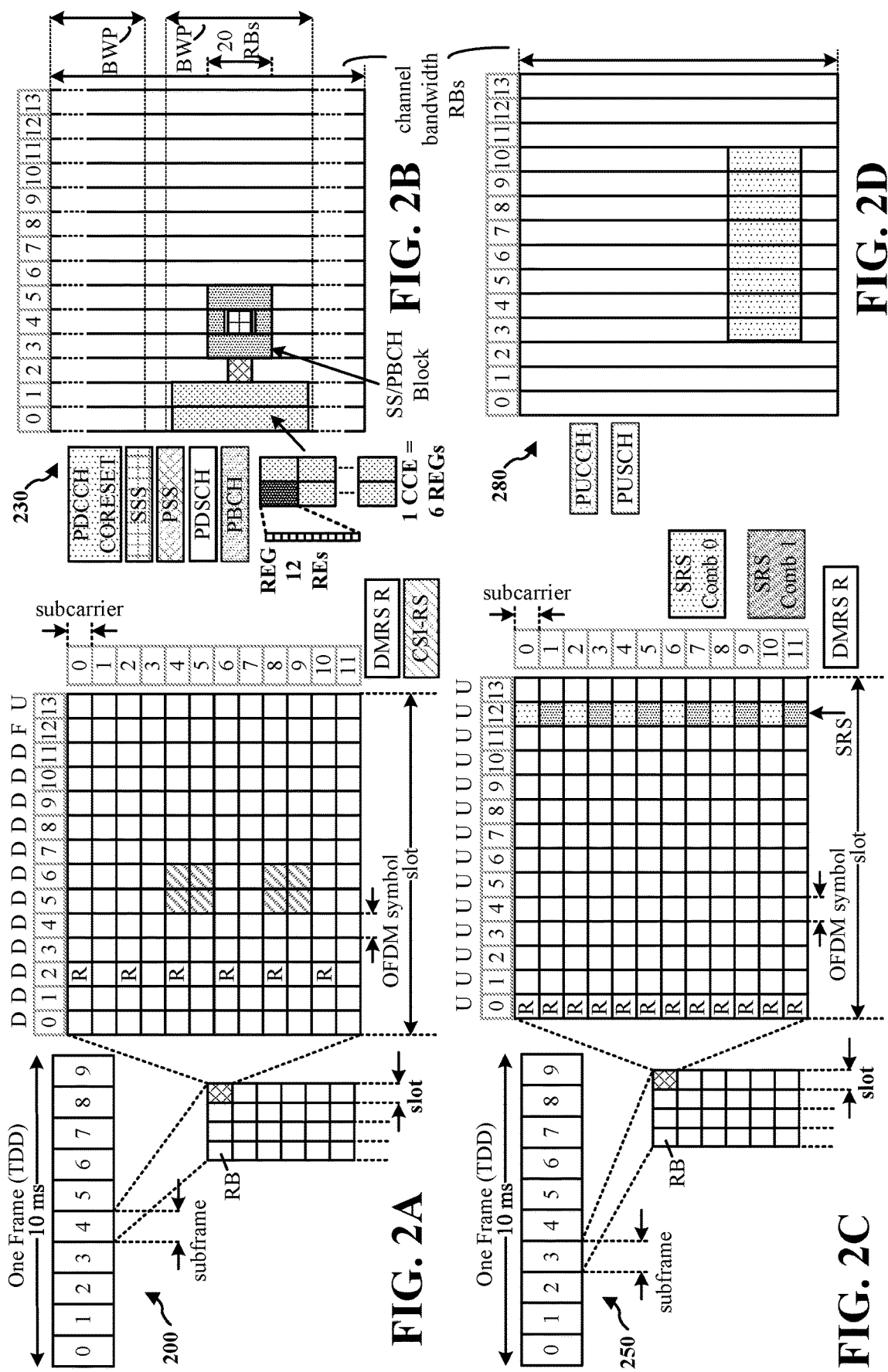
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| $\mu$ | SCS $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |

TABLE 1-continued

Numerology, SCS, and CP

| μ | SCS $\Delta f = 2^\mu \cdot 15 [\text{kHz}]$ | Cyclic prefix |
|---|---|---|
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
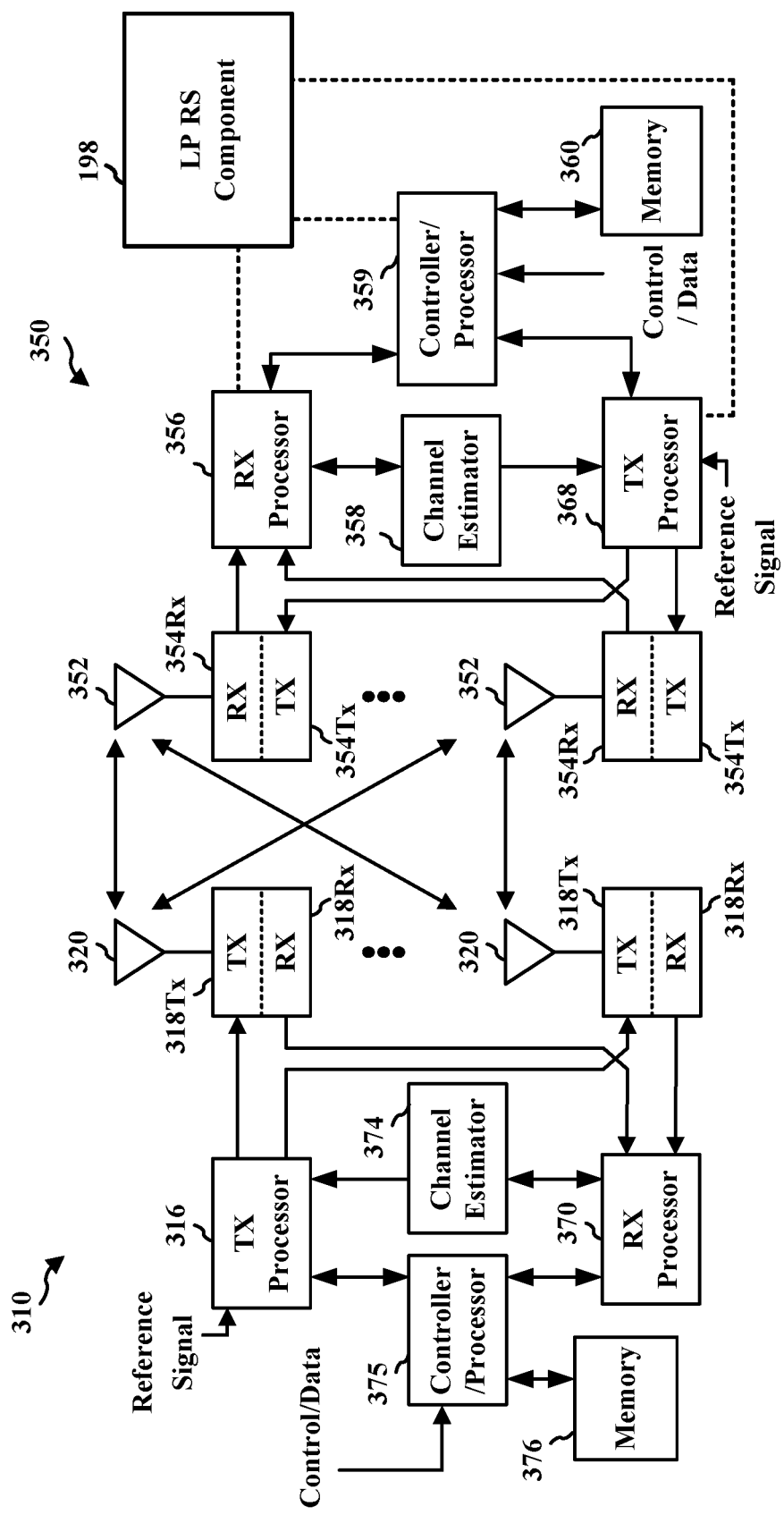
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with LP RS component 198 of FIG. 1.

At least one of the TX processor 316, the RX processor 370, and the controller/processor 375 may be configured to perform aspects in connection with LP RS component 199 of FIG. 1.

Figure 4:
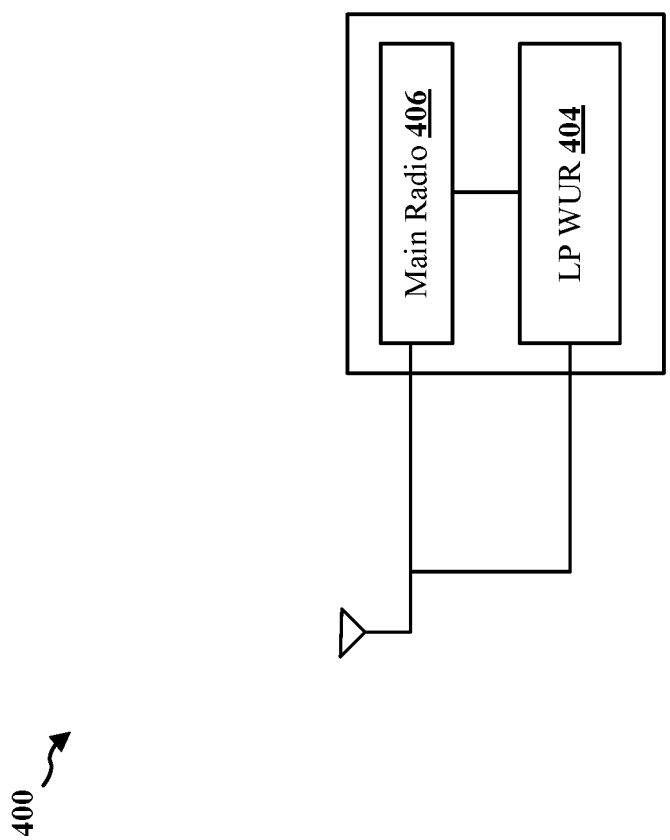
FIG. 4 is a diagram illustrating example LP WUR and MR.
Figure 5:
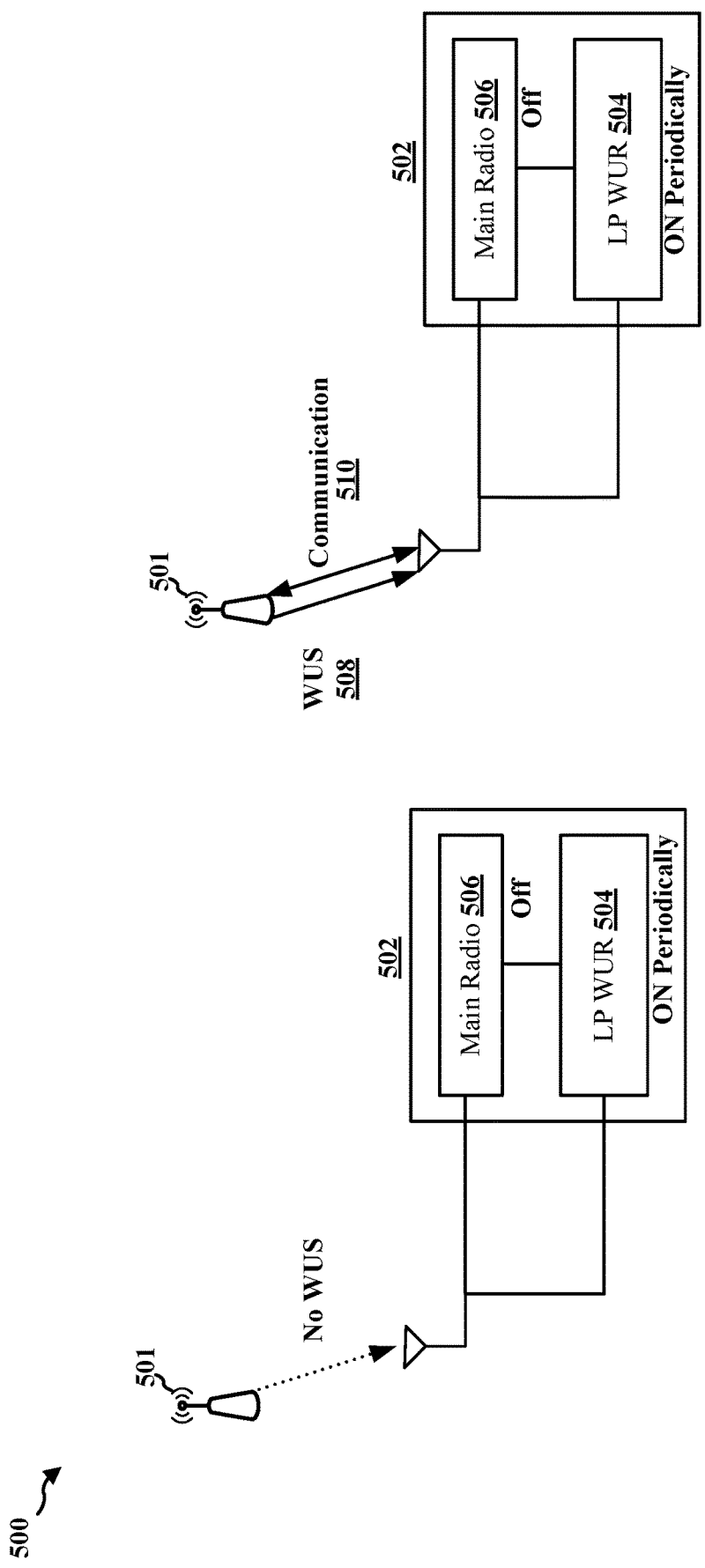
FIG. 5 is a diagram illustrating example operations of LP WUR and MR.

FIG. 4 is a diagram 400 illustrating example LP WUR 404 and MR 406. LP WUR 404 and MR 406 may be respectively referred to as a first radio and a second radio or vice versa. A LP WUR receiver may be a receiver separate from the MR 406 on a wireless device. The LP WUR 404 may be used for enabling lower power consumption at the wireless device and may have a much lower power consumption than the MR. To save power, the MR may enter a sleep mode and the LP WUR may be periodically listening (which may also be referred to as "monitoring") to WUS. FIG. 5 is a diagram 500 illustrating example operations of LP WUR 504 and MR 506 on a wireless device 502. LP WUR 504 and MR 506 may be respectively referred to as a first radio and a second radio or vice versa. When there is no WUS transmitted from the network entity 501, the LP WUR 504 may be periodically listening to the WUS and the MR 506 may be in a sleep mode (e.g., off). Upon receiving WUS 508 via the LP WUR 504, the wireless device 502 may turn on the MR to enable data communications 510 via the MR.

Figure 6:
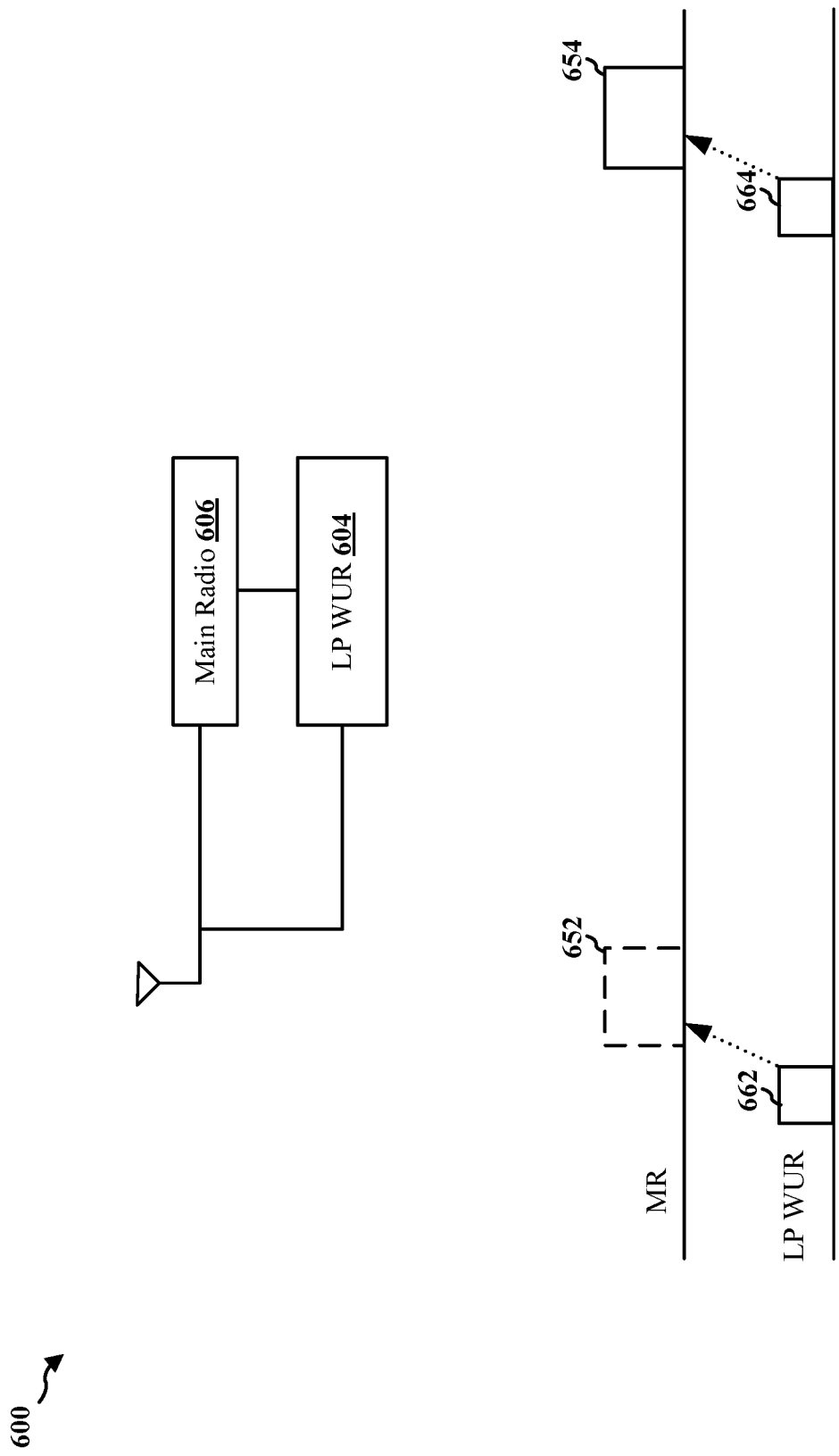
FIG. 6 is a diagram illustrating example operations of LP WUR and MR.

FIG. 6 is a diagram 600 illustrating example operations of LP WUR and MR. The LP WUR and the MR shown in FIG. 6 may be respectively referred to as a first radio and a second radio or vice versa. The LP WUR 604 is a companion receiver monitoring WUS with very low power while MR 606 is in sleep state. The LP WUR 604 may wake up the MR 606 when data communication may occur. For example, the LP WUR 604 may monitor for WUS at time occasion 662. Based on not receiving a WUS, the MR 606 may not wake up at time occasion 652. The LP WUR 604 may monitor for WUS at time occasion 664. Based on receiving a WUS, the MR 606 may wake up at time occasion 654. The LP WUR 604 may consume low power and may be powered separately from the MR 606. The LP WUR 604 may not be used for bidirectional communication with a network entity (such as a base station), and may be used for monitoring paging information so that MR 606 may be woke up for communication.

Usage of LP WUR may reduce total power consumption because unnecessary awake of the more power consuming MR may be avoided. Usage of LP WUR may also reduce total latency. Because the LP WUR consumes very low power, it may allow frequent WUS monitoring, reducing average latency (e.g., less average latency compared to waking up MR less frequently). Example performance metrics for LP WUR may include WUR power consumption (which may be lower than sleep power of MR to enable extended operation). Example performance metrics for LP WUR may include sensitivity where higher sensitivity enable better coverage. Power hungry blocks may be avoided for low power operation, resulting in poor sensitivity and potential coverage mismatch between of WUR and MR. Therefore, sensitivity at the LP WUR may be a performance metric. Example performance metrics for LP WUR may also include data rate, false alarm or false wake up probability (false wake up may result in more power consumption), miss detection probability (miss detection may lead to poor reliability and increase delay), and MR wake-up time (which is correlated to overall latency).

Example waveform used for LP WUR signals, such as LP WUS or LP RS, may include OFDM-based waveforms where the receiver may process the WUS at baseband and may reuse MR component to receive the LP WUS or on-off keying (OOK) based waveform where the receiver uses an envelope detector, which may enable a LP WUR that is completely separate from the MR and a larger power saving. OOK may be a modulation scheme of keying a sinusoidal carrier signal on and off with a unipolar binary signal (two level amplitude keying where a first amplitude represents on and a second amplitude represents off).

LP WUS may be used for paging reception and may be associated with a paging early indication. To enable a LP WUR at a wireless device to perform radio resource management, time or frequency (T/F) tracking, and resynchronization, aspects provided herein may provide LP RS. The wireless device may use such a LP RS in various different configurations. For example, if the LP WUR supports OOK waveform and the LP WUR bandwidth is less than or equal to 5 MHz with a noise figure around 7 decibels, LP RS may be based on OOK for T/F synchronization and the LP RS may be based on OOK waveform. As another example, if the LP WUR supports OOK waveform and the LP WUR bandwidth is approximately 1 MHz with a noise figure approximately 5 decibels, LP RS may be used if minimum coupling loss (MCL) is 164 decibel or lower. MCL may be the minimum distance loss including antenna gain measured between antenna connectors. In another example, if the LP WUR supports OOK waveform and the LP WUR bandwidth is approximately 5 MHz with a noise figure approximately 5 decibels, the wireless device might be able to not use LP RS to satisfy a MCL of 140 decibels. As used herein, the term "LP RS" may refer to a signal received via a LP WUR that is used for T/F tracking and radio resource management. LP RS may be carried on LP RS resources (which may be arranged as LP RS resource sets). The term "LP WUS" may refer to a signal received via a LP WUR that is used for waking up the MR and may be associated with a paging early indication, an idle discontinuous reception (DRX) cycle (e.g., associated with paging monitoring occasions) during RRC idle mode/state, a discontinuous reception (DRX) cycle (e.g., associated with paging monitoring occasions) during RRC inactive mode/state, wake up monitoring occasions associated with a connected-mode DRX cycle, or the like. In some aspects, the term "monitoring occasion" may refer to a configured time occasion where a UE is configured to monitor a transmission. In some aspects a low power wake up receiver may be referred to as a low power wake up radio and a main receiver may be referred to as a main radio, and vice versa. As described herein, reference to a radio may include reference to a radio, a receiver, or a transceiver; and vice versa. For example, a low power receiver (e.g., a low power wake up receiver) may also be referred to as a low power radio (e.g., a low power wake up radio), a low power transceiver (e.g., a low power wake up transceiver), or the like. As another example, a main receiver may also be referred to as a main radio, a main transceiver, or the like. As another example, a main radio may also be referred to as a main receiver, a main transceiver, or the like. As another example, a first radio may be referred to as a first receiver (e.g., a first lower power wake up receiver), a first transceiver (e.g., first a low power wake up transceiver), or the like; and a second radio may be referred to as a second receiver, a second transceiver, or the like. As another example, a first radio may be referred to as a first receiver, a first transceiver, or the like; and a second radio may be referred to as a second receiver (e.g., a second lower power wake up receiver), a second transceiver (e.g., a second low power wake up transceiver), or the like. The term "power state" may refer to a power state of a main radio. For example, the main radio may wake up from a sleep state, an off state, or another state where the main radio is configured to refrain from receiving or transmitting some (or all) communications to save power to an on state or an awake state.

In some aspects, LP WUS may be a coded control signal that may be based on polar coding other types of coding. In some aspects, LP WUS may be a sequence based signal (e.g., based on discrete Fourier transform, Gold, amplitude shift keying (ASK), phase shift keying (PSK), pulse position modulation (PPM), pulse width modulation (PWM), pulse amplitude modulation (PAM), Walsh, m-seq, Zadoff, Reed Solomon, or the like). In some aspects, the LP WUS may be a time-domain sequence based signal which may be based on modulating the time domain signal/waveform with a sequence. In some aspects, LP WUS may be an on-off keying (OOK) based waveform signal where the waveform may be OFDM and based on modulating the time domain signal/waveform with low and high voltage signals. In some aspects, the LP RS may be a sequence based signal (e.g., based on DFT, Gold, ASK, PSK, PPM, PWM, PAM, Walsh, m-seq, Zadoff, Reed Solomon, or the like). In some aspects, the LP RS may be a time-domain sequence based signal which may be based on modulating the time domain signal with a sequence of complex numbers/parameters/coefficients. In some aspects, LP RS may be an on-off keying (OOK) based waveform signal where the waveform may be OFDM and based on modulating the time domain signal/waveform with low and high voltage signals.

In some aspects, there may be a subtype of LP RS used for synchronization. The subtype of LP RS may be a sequence based signal. In some aspects, the subtype of LP RS may be a time-domain sequence based signal which may be based on modulating the time domain signal with a sequence of complex numbers/parameters/coefficients. In some aspects, the subtype of LP RS may be an on-off keying (OOK) based waveform signal where the waveform may be OFDM, DFT-s-OFDM, or single carrier QAM (SC-QAM) and based on modulating the time domain signal/waveform with low and high voltage signals.

Figure 7:
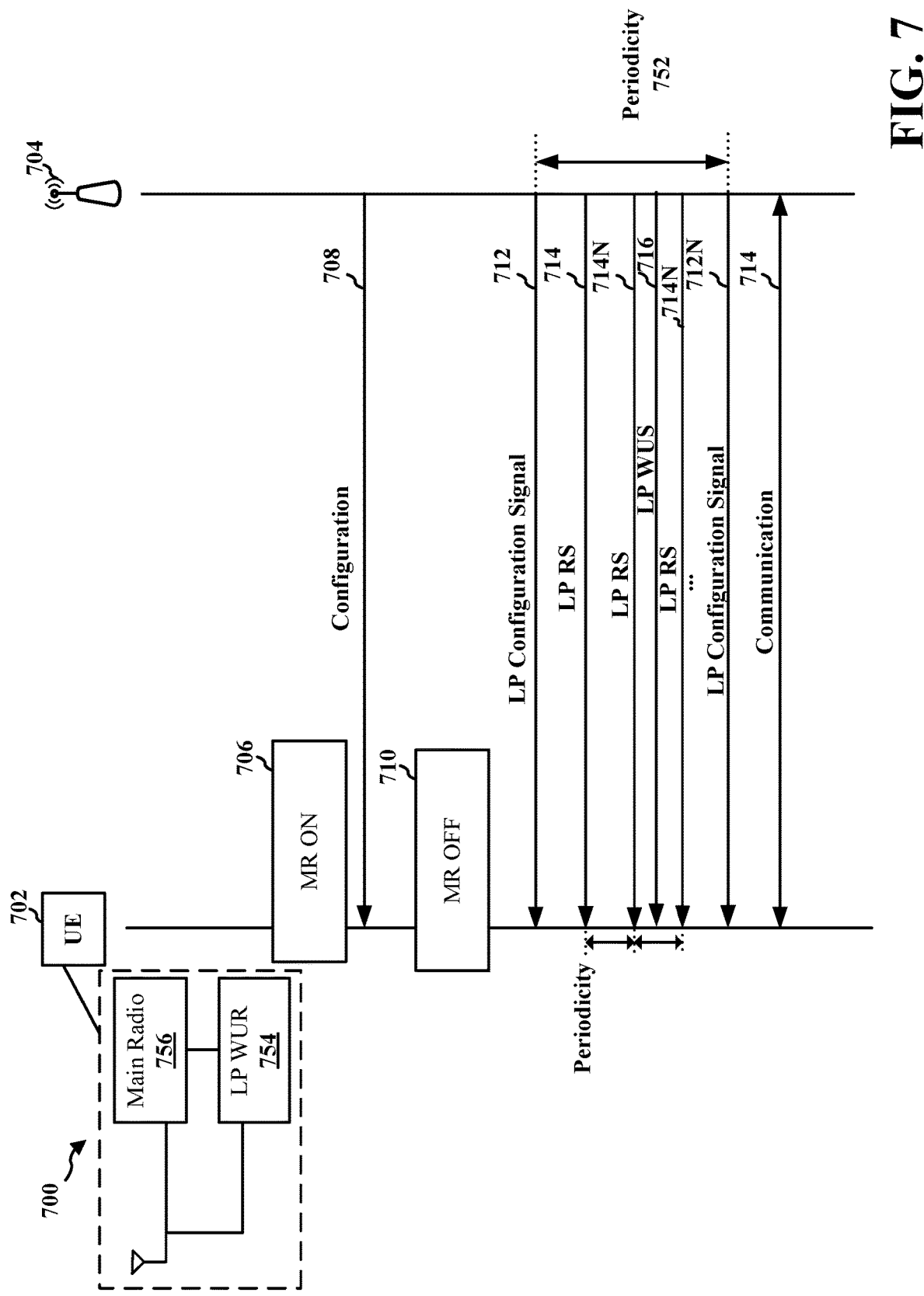
FIG. 7 is a diagram illustrating example communications between a network entity and a UE.

FIG. 7 is a diagram 700 illustrating example communications between a network entity 704 and a UE 702. In some aspects, the network entity 704 may be referred to as a network node. In some aspects, the network node may be implemented as an aggregated base station, a component of a disaggregated base station, an integrated access and backhaul (IAB) node, a relay node, a sidelink node, or the like. In some aspects, the network entity 704 may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

In some aspects, the UE 702 may include a MR 756 and a LP WUR 754. LP WUR 756 and MR 756 may be respectively referred to as a first radio and a second radio or vice versa. In some aspects, the LP WUR 754 may be used to receive and transmit LP RS or LP WUS. In some aspects, the LP WUR 754 may be ultra-low power with passive components for both receiving and transmitting, enabling longer sleep time for MR 756. The LP WUR 754 may wake up MR 756 under different circumstances based on aspects described herein. In some aspects, the LP WUR 754 may include a transceiver with envelope detection-based reception or a transceiver that may process OFDM waveforms. In some aspects, the transceiver may use load modulation based transmission, e.g., absorbing or reflecting incoming EM waves (which may be otherwise referred to as "carrier wave"). In some aspects, the transceiver included as part of the LP WUR 754 may be associated with integrated circuit (IC) support for processing UL and DL data (e.g., reading memory, computing cyclic redundancy check (CRC)). In some aspects, the LP WUR 754 may be equipped with power harvesting circuitry enabling wireless power harvesting and charging the battery in idle mode.

As illustrated in FIG. 7, the UE 702 may have the MR 756 to be awake (on) at 706 and may receive configuration 708 on the MR 756. In some aspects, the configuration 708 may include configurations for periodic LP RS including LP RS 714 and LP RS 714N, periodic LP configuration signal including LP configuration signal 712 and LP configuration signal 712N, and LP WUS. In some aspects, the configuration 708 may include configurations representing where (e.g., time or frequency) to search or monitor for LP WUS, LP RS, or LP configuration signal. In some aspects, the configuration 708 may be received via layer 1 (L1), layer 2 (L2) signaling, or layer 3 (L3) signaling where L1 may be the PHY layer, L2 may be the MAC layer or the logical link control layer, and L3 may be the network layer. In some aspects, the configuration 708 may be carried in one of system information (SI), radio resource control (RRC) signaling, a medium access control (MAC) control element (MAC-CE), or downlink control information (DCI). In some aspects, the configuration 708 may further indicate a RS configuration that may be used for LP WUR or LP RS.

In some aspects, the UE 702 may have the MR 756 to enter a sleep mode (off) at 710. The UE 702 may receive periodic LP RS including LP RS 714 and LP RS 714N via the LP WUR 754 while the MR 756 is asleep. In some aspects, a same numerology may be used for LP RS (such as LP RS 714 and LP RS 714N) and LP WUS (such as LP WUS 716). In some aspects, the SCS for the LP RS (such as LP RS 714 and LP RS 714N) may be different from the LP WUS (such as LP WUS 716). In some aspects, LP WUS (such as LP WUS 716) and LP RS (such as LP RS 714 and LP RS 714N) may be transmitted via a same antenna port (and the UE 702 may assume that the LP WUS and the LP RS may be transmitted via a same antenna port at the network entity 704). In some aspects, the LP WUS (such as LP WUS 716) and LP RS (such as LP RS 714 and LP RS 714N) may be quasi-co-located. There may be a number of different quasi-co-location (QCL) QCL types. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam). In some aspects, if the LP WUR 754 supports multi-beam operation, QCL type D may enable the UE 702 to receive LP WUS (such as LP WUS 716) based on a receive beam used for receiving LP RS (such as LP RS 714 and LP RS 714N). As used herein, the term "beam" may be used to refer to a spatial filter (also referred to as a spatial parameter) for transmitting or receiving a transmission.

In some aspects, LP RS (such as LP RS 714 and LP RS 714N) may be used for channel estimation to receive the LP WUS (such as the LP WUS 716) in additional to being used for T/F tracking and radio resource management.

In some aspects, LP RS (such as LP RS 714 and LP RS 714N) and LP WUS (such as LP WUS 716) may have their own configured monitored occasions (e.g., configured based on configuration 708) and may have different periodicities. In some cases, LP RS and LP WUS may overlap. In some aspects, when LP WUS and LP RS are configured to be overlapping, the network entity 704 may be configured to not transmit the LP WUS or not transmit the LP RS. In some aspects, when LP WUS and LP RS are configured to be overlapping, the UE 702 may be configured to not monitor the LP WUS or not monitor the LP RS. In some aspects, when LP WUS and LP RS are configured to be overlapping, the UE 702 may be configured to not monitor the LP WUS or not monitor the LP RS and the network entity 704 may be configured to not transmit the LP WUS or not transmit the LP RS.

In some aspects, when LP WUS and LP RS are configured to be overlapping, LP WUS may be multiplexed with LP RS. FIG. 8A is a diagram 800 illustrating example multiplexing of LP WUS (which may be carried in a first set of REs 804A and a second set of REs 804B) and LP RS (which may be carried in a first set of REs 802A and a second set of REs 802B) based on time division multiplexing. FIG. 8B is a diagram 810 illustrating example multiplexing of LP WUS (which may be carried in a set of REs 814) and LP RS (which may be carried in a first set of REs 812A and a second set of REs 812B) based on frequency division multiplexing. FIG. 8C is a diagram 820 illustrating example multiplexing of LP WUS (which may be carried in a set of REs 824) and LP RS (which may be carried in a first set of REs 822A, a second set of REs 822B, a third set of REs 822C, a fourth set of REs 822D, a fifth set of REs 822E, and a sixth set of REs 822F). In some aspects, a multiplexing type of the LP RS and the LP WUS may be indicated to the UE 702 via the MR 756 and based on L1/L2/L3 signaling, such as in configuration 708.

In some aspects, in addition to or instead of the configuration 708, LP configuration signal (such as LP configuration signal 712 and LP configuration signal 712N) may be used for configuring or updating configuration of LP RS and LP WUS. In some aspects, LP configuration signal (such as LP configuration signal 712 and LP configuration signal 712N) may include time information, frequency information, or information regarding sequences used for the LP RS. In some aspects, LP configuration signal (such as LP configuration signal 712 and LP configuration signal 712N) may include time information or frequency information for the LP WUS. In some aspects, LP configuration signal (such as LP configuration signal 712 and LP configuration signal 712N) may indicate periodicities for the LP RS or the LP WUS. In some aspects, LP configuration signal (such as LP configuration signal 712 and LP configuration signal 712N) may update one or more parameters associated with the LP RS or the LP WUS based on a list of restricted or allowed updates provided via MR 754 (for example, allowed updates may include updates of time and frequency information) for LP RS and LP WUS (e.g., as part of configuration 708). In some aspects, a periodicity 752 of the LP configuration signal may be configured via the MR 756 or the LP WUR 754 (e.g., as part of configuration 708). FIG. 8D is a diagram 850 illustrating example LP configuration signal (LP configuration signal 856A and LP configuration signal 856B), LP WUS (854), and LP RS (LP RS 852A, LP RS 852B, LP RS 852C, and LP RS 852D).

In some aspects, because a same set of resources may be used for LP RS and LP WUS, a data sequence (e.g., for LP WUS) may be generated based on puncturing where the data sequence is generated based on all resources (REs for data and REs for LP RS), and the generated data symbols that are supposed to be LP RS may be removed and replaced with LP RS symbols. In some aspects, a data sequence may be generated based on rate matching where the sequence is generated based on REs for LP WUS. As an example, if there are a total of 10 REs including 4 REs for LP RS and 6 REs for LP WUS, based on puncturing, the LP WUS may be generated based on 10 REs and 4 out of the 10 REs may be replaced with LP RS. Based on rate matching, the LP WUS may be generated based on 6 REs. In some aspects, whether rate matching or puncturing is used may be configured without signaling or configured based on L1/L2/L3 signaling via the MR (e.g., in configuration 708).

In some aspects, various configurations, such as the configuration 708 which may include configurations for periodic LP RS including LP RS 714 and LP RS 714N, periodic LP configuration signal including LP configuration signal 712 and LP configuration signal 712N, and LP WUS or LP configuration signal (such as LP configuration signal 712 and LP configuration signal 712N) or LP configuration signals (such as LP configuration signal 712 and LP configuration signal 712N) may be based on a radio resource control (RRC) state (e.g., connected, idle, or inactive) associated with the UE 702 (e.g., RRC state of the MR 756). In some aspects, the LP WUR or LP RS may be configured to be based on a RRC state. For example, the LP WUR or LP RS may be configured to be (e.g., based on configuration 708 or LP configuration signals) associated with a first periodicity in a first RRC state, a second periodicity in a second RRC state, or a third periodicity in a third RRC state. There may be less periodic signals during RRC connected and RRC inactive and there may be lower periodicity during RRC idle.

FIG. 9 is a flowchart 900 of a method of wireless communication. The method may be performed by a first network entity, such as a UE (e.g., the UE 104, the UE 702; the apparatus 1304). The UE may include a first radio or a second radio. In some aspects, the first radio is a low power wake up radio and the second radio is a main radio. In some aspects, the second radio includes the first radio. In some aspects, the first radio and the second radio are separate components.

At 902, the UE may receive, from a second network entity, one or more LP reference signal (LP RS) resources, where the one or more LP RS resources are configured for at least one of: time or frequency tracking or synchronization, time or frequency error estimation or correction, radio resource management (RRM), or channel estimation. For example, the UE 702 may receive, from a second network entity, one or more LP reference signal (LP RS) resources (e.g., LP RS 714), where the one or more LP RS resources are configured for at least one of: time or frequency tracking or synchronization, time or frequency error estimation or correction, radio resource management (RRM), or channel estimation. In some aspects, 902 may be performed by LP RS component 198.

At 904, the UE may receive (e.g., from the second network entity) a LP wake up signal (LP WUS) based on the one or more LP RS resources, where the LP WUS is associated with one or more monitoring occasions, where the LP WUS is quasi-co-located with at least one of the one or more LP RS resources, and where the LP WUS is associated with a first configuration and the at least one LP RS resource is associated with a second configuration. For example, the UE 702 may receive a LP wake up signal (LP WUS) (e.g., 716) based on the one or more LP RS resources, where the LP WUS is associated with one or more monitoring occasions, where the LP WUS is quasi-co-located with at least one of the one or more LP RS resources, and where the LP WUS is associated with a first configuration and the at least one LP RS resource is associated with a second configuration. In some aspects, 904 may be performed by LP RS component 198.

At 905, the UE may cause, based on the LP WUS, the second radio to wake up from a power state. For example, the UE 702 may cause, based on the LP WUS, the second radio (e.g., MR 756) to wake up from a power state. In some aspects, 905 may be performed by LP RS component 198.

Figure 10:
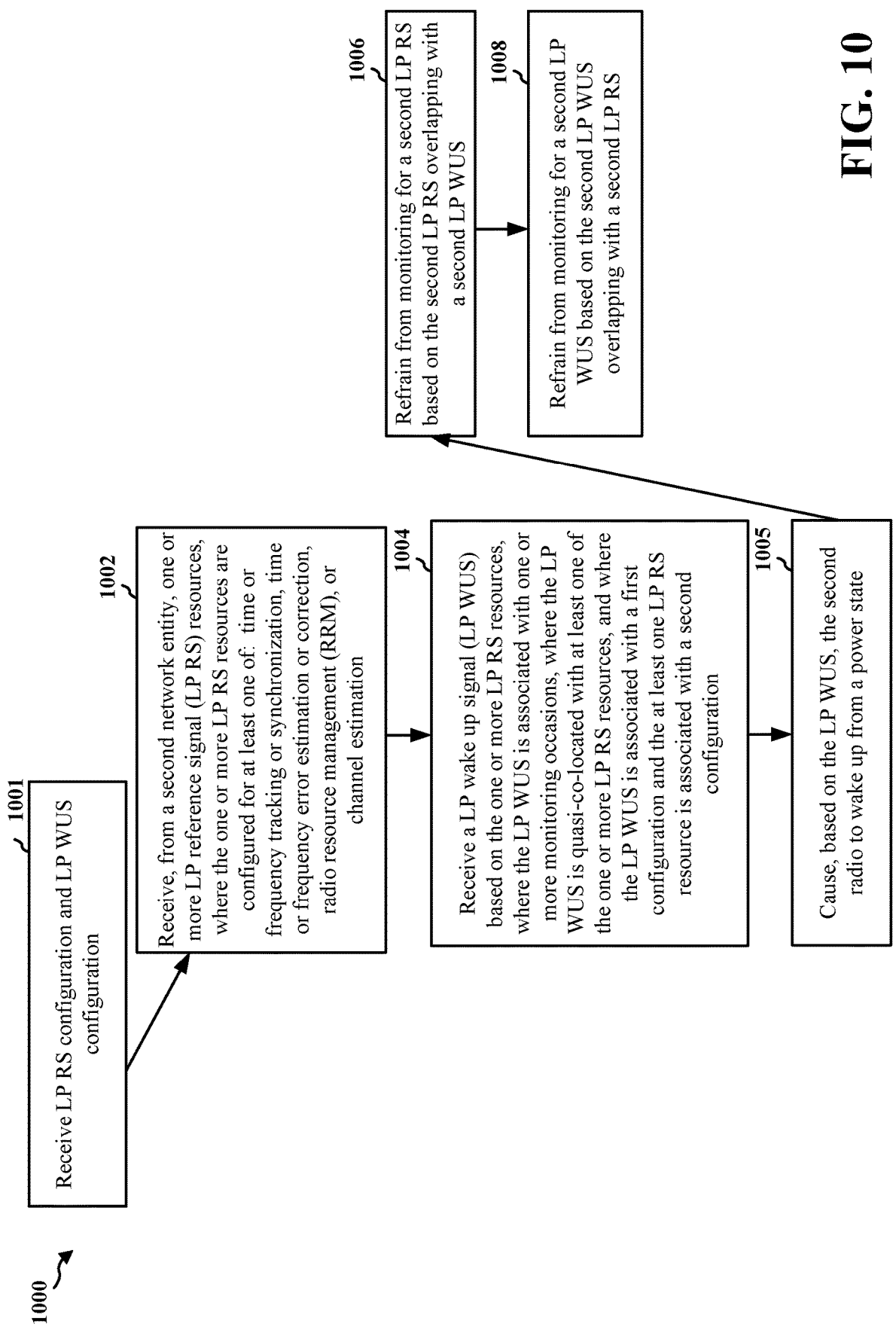
FIG. 10 is a flowchart of a method of wireless communication.

FIG. 10 is a flowchart 1000 of a method of wireless communication. The method may be performed by a first network entity, such as a UE (e.g., the UE 104, the UE 702; the apparatus 1304). The UE may include a first radio or a second radio. In some aspects, the first radio is a low power wake up radio and the second radio is a main radio. In some aspects, the second radio includes the first radio. In some aspects, the first radio and the second radio are separate components.

In some aspects, the first configuration is at least one of a first subcarrier spacing (SCS), a first number (e.g., quantity) of symbols or time units, a first bandwidth (BW), first waveform information, first coding information, or first modulation information and the second configuration is at least one of a second subcarrier spacing (SCS), a second number (e.g., quantity) of symbols or time units, a second bandwidth (BW), second waveform information, second coding information, or second modulation information. In some aspects, the first configuration is a first SCS and the second configuration is a second SCS, the first SCS being different from the second SCS. In some aspects, the first configuration is a first number (e.g., quantity) of symbols or time units and the second configuration is a second number (e.g., quantity) of symbols or time units, the first number of symbols or time units being different from the second number of symbols or time units. In some aspects, the first configuration is a first BW and the second configuration is a second BW, the first BW being different from the second BW. In some aspects, the first configuration is a first wave information and the second configuration is a second wave information, the first wave information being different from the second wave information. In some aspects, the first configuration is a first coding information and the second configuration is a second coding information, the first coding information being different from the second coding information. In some aspects, the first configuration is a first modulation information and the second configuration is a second modulation information, the first modulation information being different from the second modulation information.

In some aspects, the first configuration is a LP WUS configuration associated with a first set of sequences, a first periodicity, or a first set of time and frequency resources, where the second configuration is a LP RS configuration associated with a second set of sequences, a second periodicity, or a second set of time and frequency resources. At 1001, the first radio of the UE may receive, from the second network entity, the LP RS configuration and the LP WUS configuration. For example, the LP WUR of the UE 702 may receive, from the second network entity, the LP RS configuration and the LP WUS configuration (e.g., based on the LP configuration signal 712). In some aspects, 1001 may be performed by LP RS component 198. In some aspects, to receive the LP RS configuration and the LP WUS configuration (e.g., based on a layer 1 (L1) signaling, a layer 2 (L2) signaling, or a layer 3 (L3) signaling), the first radio of the UE may receive, from the second network entity, a LP configuration signal including the LP RS configuration and the LP WUS configuration, where the LP configuration signal is associated with a third periodicity. In some aspects, a second radio of the UE may receive one or more parameters associated with the LP configuration signal including the third periodicity, where the one or more parameters are received from the second network entity in at least one of SI, RRC signaling, a MAC-CE, or DCI.

At 1002, the first radio of the UE may receive, from a second network entity, one or more LP reference signal (LP RS) resources, where the one or more LP RS resources are configured for at least one of: time or frequency tracking or synchronization, time or frequency error estimation or correction, radio resource management (RRM), or channel estimation. For example, the UE 702 may receive, from a second network entity, one or more LP reference signal (LP RS) resources (e.g., LP RS 714), where the one or more LP RS resources are configured for at least one of: time or frequency tracking or synchronization, time or frequency error estimation or correction, radio resource management (RRM), or channel estimation. In some aspects, 1002 may be performed by LP RS component 198. In some aspects, 1002 may be performed by LP RS component 198. In some aspects, the one or more LP RS resources are based on an on-off keying (OOK) waveform that represents reference signal or sequence signal based on a presence or an absence of a wave. In some aspects, the one or more LP RS resources are based on an orthogonal frequency division multiplexing (OFDM) waveform. In some aspects, the one or more LP RS resources correspond to one or more LP RS resource sets. In some aspects, the one or more LP RS resources are associated with a periodicity.

At 1004, the first radio of the UE may receive (e.g., from the second network entity) a LP wake up signal (LP WUS) based on the one or more LP RS resources, where the LP WUS is associated with one or more monitoring occasions, where the LP WUS is quasi-co-located with at least one of the one or more LP RS resources, and where the LP WUS is associated with a first configuration and the at least one LP RS resource is associated with a second configuration. For example, the UE 702 may receive a LP wake up signal (LP WUS) (e.g., 716) based on the one or more LP RS resources, where the LP WUS is associated with one or more monitoring occasions, where the LP WUS is quasi-co-located with at least one of the one or more LP RS resources, and where the LP WUS is associated with a first configuration and the at least one LP RS resource is associated with a second configuration. In some aspects, 1004 may be performed by LP RS component 198.

In some aspects, the LP WUS is quasi-co-located with a subset of the one or more LP RS resources based on a QCL type associated with a spatial receive parameter associated with beam information, and to receive the LP WUS, the UE may receive the LP WUS based on the spatial receive parameter. In some aspects, the LP WUS is associated with a first periodicity and the one or more LP RS resources is associated with a second periodicity, and where the one or more LP RS resources are associated with at least one monitoring occasion separate from the one or more monitoring occasions. In some aspects, the LP WUS is multiplexed with the one or more LP RS resources based on a multiplexing type. In some aspects, the multiplexing type corresponds to one of frequency division multiplexing or time division multiplexing. In some aspects, a second radio of the UE may receive an indication representing the multiplexing type, where the indication is received from the second network entity in at least one of SI, RRC signaling, a MAC-CE, or DCI (e.g., in configuration 708). In some aspects, the LP WUS is based on a set of REs and the LP RS is based on a first subset of the REs in the set of REs based on replacement in the first subset of the REs, or where the LP WUS is based on a second subset of REs in the set of REs and the LP RS is based on the first subset of the REs. In some aspects, the first configuration or the second configuration is at least one of a subcarrier spacing (SCS), a number of symbols or time units, a bandwidth (BW) (e.g., resource elements, resource blocks, block of resource blocks), waveform information, coding information, and modulation information.

At 1005, the first radio of the UE may cause, based on the LP WUS, the second radio to wake up from a power state. For example, the UE 702 may cause, based on the LP WUS, the second radio (e.g., MR 756) to wake up from a power state. In some aspects, 1005 may be performed by LP RS component 198.

At 1006, the UE may refrain from monitoring for a second LP RS based on the second LP RS being configured to be overlapping with a second LP WUS. For example, the UE 702 may refrain from monitoring for a second LP RS based on the second LP RS being configured to be overlapping with a second LP WUS. In some aspects, 1006 may be performed by LP RS component 198.

At 1008, the UE may refrain from monitoring for a second LP WUS based on the second LP WUS being configured to be overlapping with a second LP RS. For example, the UE 702 may refrain from monitoring for a second LP WUS based on the second LP WUS being configured to be overlapping with a second LP RS. In some aspects, 1008 may be performed by LP RS component 198.

Figure 11:
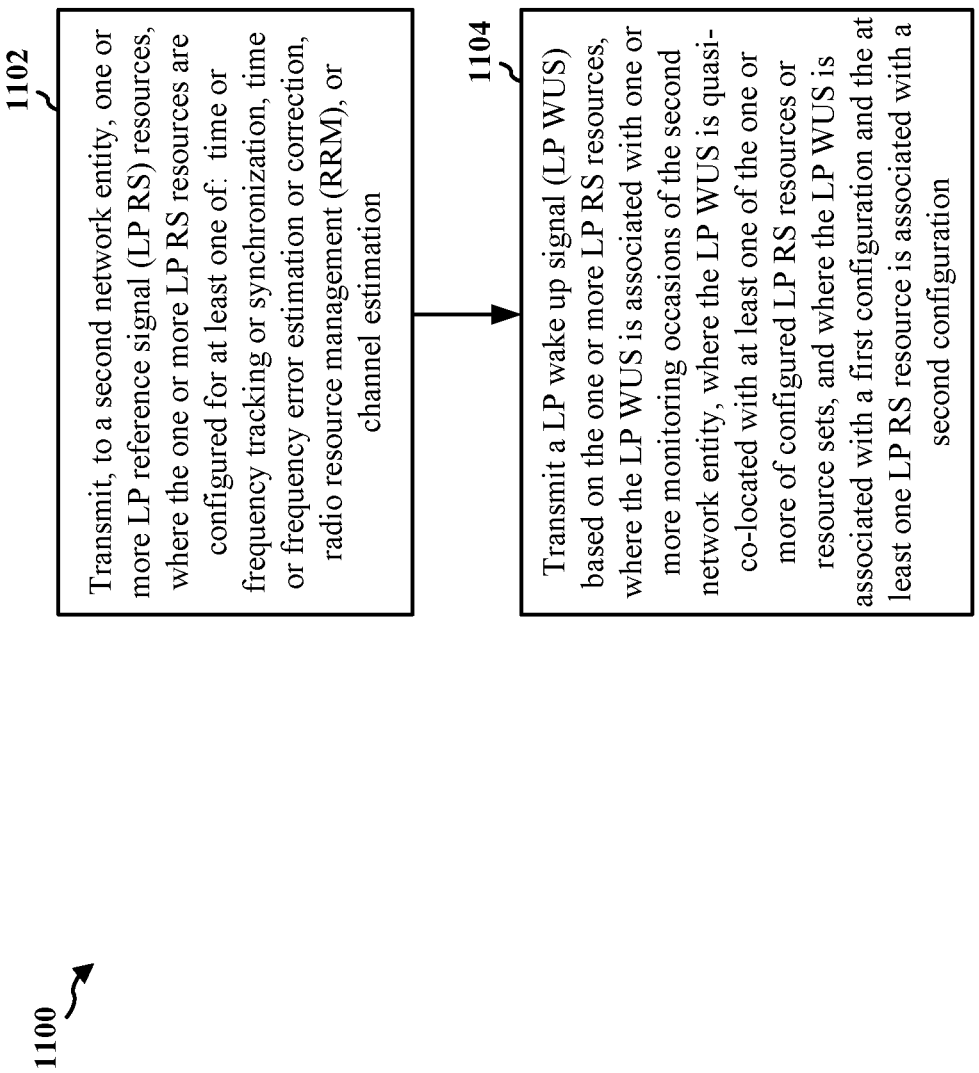
FIG. 11 is a flowchart of a method of wireless communication.

FIG. 11 is a flowchart 1100 of a method of wireless communication. The method may be performed by a first network entity (e.g., the base station 102, the network entity 704, the network entity 1302, the network entity 1402).

At 1102, the network entity may transmit, to a second network entity (e.g., for a first radio of the second network entity), one or more LP reference signal (LP RS) resources (e.g., via an antenna port), where the one or more LP RS resources are configured for at least one of: time or frequency tracking or synchronization, time or frequency error estimation or correction, radio resource management (RRM), or channel estimation. For example, the network entity 704 may transmit, for a first radio (e.g., LP WUR 752) on a second network entity (e.g., UE 702), one or more LP reference signal (LP RS) resources via an antenna port, where the one or more LP RS resources are configured for at least one of: time or frequency tracking or synchronization, time or frequency error estimation or correction, radio resource management (RRM), or channel estimation. In some aspects, 1102 may be performed by LP RS component 199.

At 1104, the network entity may transmit, to the second network entity, a LP wake up signal (LP WUS) (e.g., via the antenna port) based on the one or more LP RS resources, where the LP WUS is associated with one or more monitoring occasions of the second network entity, where the LP WUS is quasi-co-located with at least one of the one or more of configured LP RS resources, and where the LP WUS is associated with a first configuration and the at least one LP RS resource is associated with a second configuration. For example, the network entity 704 may transmit a LP wake up signal (LP WUS) (e.g., LP WUS 716) via the antenna port based on the one or more LP RS resources, where the LP WUS is associated with one or more monitoring occasions of the second network entity, where the LP WUS is quasi-co-located with at least one of the one or more of configured LP RS resources, and where the LP WUS is associated with a first configuration and the at least one LP RS resource is associated with a second configuration. In some aspects, 1104 may be performed by LP RS component 199.

Figure 12:
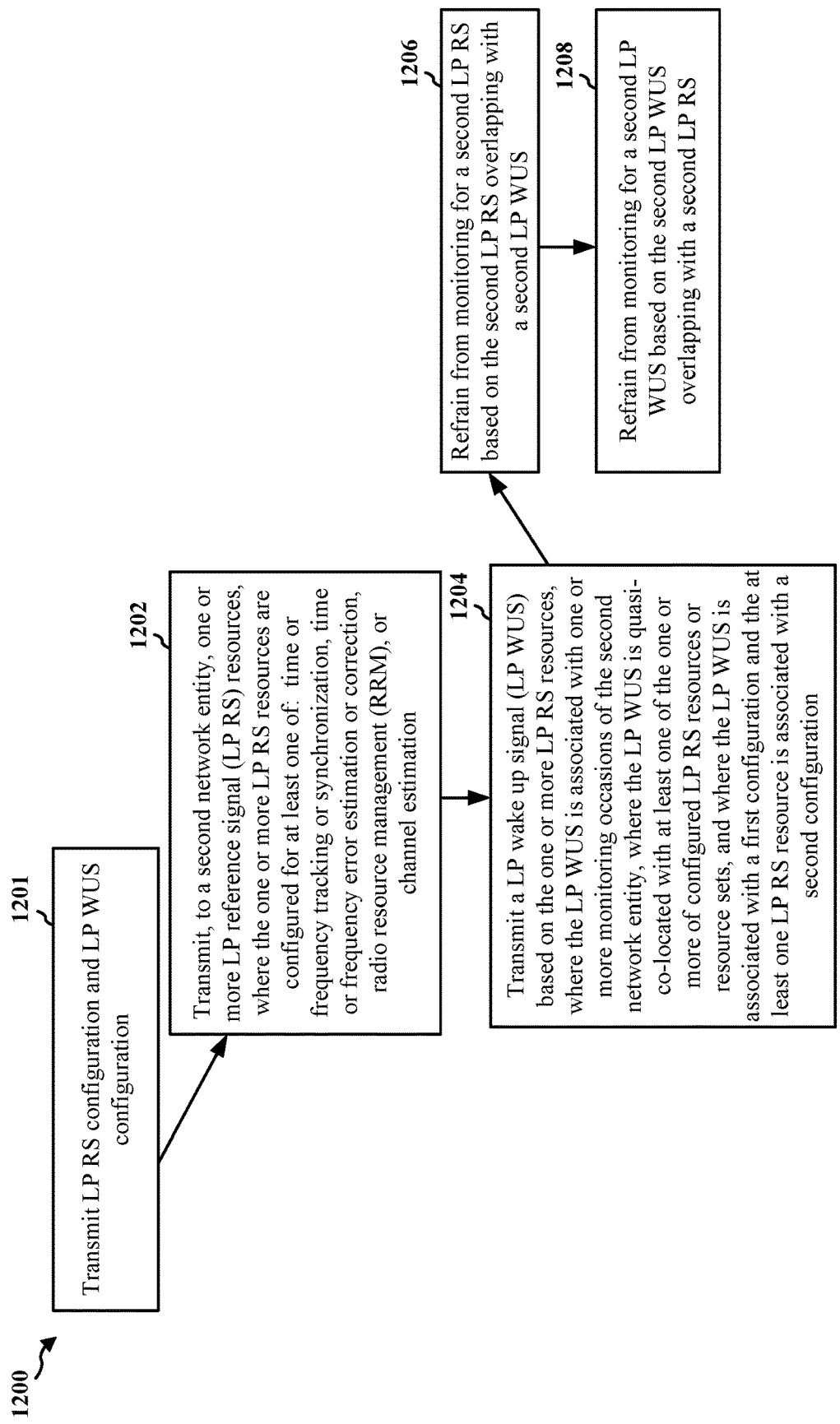
FIG. 12 is a flowchart of a method of wireless communication.

FIG. 12 is a flowchart 1200 of a method of wireless communication. The method may be performed by a first network entity (e.g., the base station 102, the network entity 704, the network entity 1302, the network entity 1402).

In some aspects, the first configuration is at least one of a first subcarrier spacing (SCS), a first number (e.g., quantity) of symbols or time units, a first bandwidth (BW), first waveform information, first coding information, or first modulation information and the second configuration is at least one of a second subcarrier spacing (SCS), a second number (e.g., quantity) of symbols or time units, a second bandwidth (BW), second waveform information, second coding information, or second modulation information. In some aspects, the first configuration is a first SCS and the second configuration is a second SCS, the first SCS being different from the second SCS. In some aspects, the first configuration is a first number (e.g., quantity) of symbols or time units and the second configuration is a second number (e.g., quantity) of symbols or time units, the first number of symbols or time units being different from the second number of symbols or time units. In some aspects, the first configuration is a first BW and the second configuration is a second BW, the first BW being different from the second BW. In some aspects, the first configuration is a first wave information and the second configuration is a second wave information, the first wave information being different from the second wave information. In some aspects, the first configuration is a first coding information and the second configuration is a second coding information, the first coding information being different from the second coding information. In some aspects, the first configuration is a first modulation information and the second configuration is a second modulation information, the first modulation information being different from the second modulation information.

In some aspects, the first configuration is a LP WUS configuration associated with a first set of sequences, a first periodicity, or a first set of time and frequency resources, where the second configuration is a LP RS configuration associated with a second set of sequences, a second periodicity, or a second set of time and frequency resources. For example, the network entity 704 may transmit, for the LP WUR on the second network entity, the LP RS configuration and the LP WUS configuration (e.g., via LP configuration signal 712). In some aspects, 1201 may be performed by LP RS component 199. In some aspects, to transmit the LP RS configuration and the LP WUS configuration, the network entity may transmit, for the LP WUR on the second network entity, a LP configuration signal including the LP RS configuration and the LP WUS configuration, where the LP configuration signal is associated with a third periodicity. In some aspects, the network entity may transmit one or more parameters associated with the LP configuration signal including the third periodicity, where the one or more parameters are transmitted for the MR on the second network entity in at least one of SI, RRC signaling, a MAC-CE, or DCI.

At 1202, the network entity may transmit, to a second network entity (e.g., for a first radio of the second network entity), one or more LP reference signal (LP RS) resources (e.g., via an antenna port), where the one or more LP RS resources are configured for at least one of: time or frequency tracking or synchronization, time or frequency error estimation or correction, radio resource management (RRM), or channel estimation. For example, the network entity 704 may transmit, for a first radio (e.g., LP WUR 752) on a second network entity (e.g., UE 702), one or more LP reference signal (LP RS) resources via an antenna port, where the one or more LP RS resources are configured for at least one of: time or frequency tracking or synchronization, time or frequency error estimation or correction, radio resource management (RRM), or channel estimation. In some aspects, 1202 may be performed by LP RS component 199. In some aspects, the one or more LP RS resources are based on an on-off keying (OOK) waveform that represents reference signal or sequence signal based on a presence or an absence of a wave. In some aspects, the one or more LP RS resources are based on an orthogonal frequency division multiplexing (OFDM) waveform. In some aspects, the one or more LP RS resources correspond to one or more LP RS resource sets. In some aspects, the one or more LP RS resources are associated with a periodicity.

At 1204, the network entity may transmit, to the second network entity, a LP wake up signal (LP WUS) (e.g., via the antenna port) based on the one or more LP RS resources, where the LP WUS is associated with one or more monitoring occasions of the second network entity, where the LP WUS is quasi-co-located with at least one of the one or more of configured LP RS resources, and where the LP WUS is associated with a first configuration and the at least one LP RS resource is associated with a second configuration. For example, the network entity 704 may transmit a LP wake up signal (LP WUS) (e.g., LP WUS 716) via the antenna port based on the one or more LP RS resources, where the LP WUS is associated with one or more monitoring occasions of the second network entity, where the LP WUS is quasi-co-located with at least one of the one or more of configured LP RS resources, and where the LP WUS is associated with a first configuration and the at least one LP RS resource is associated with a second configuration. In some aspects, 1204 may be performed by LP RS component 199.

In some aspects, the LP WUS is quasi-co-located with a subset of the one or more LP RS resources based on a QCL type associated with a spatial receive parameter associated with beam information, and to transmit the LP WUS, the network entity may transmit the LP WUS based on the spatial receive parameter. In some aspects, the LP WUS is associated with a first periodicity and the one or more LP RS resources are associated with a second periodicity, and where the one or more LP RS resources are associated with at least one monitoring occasion separate from the one or more monitoring occasions. In some aspects, the LP WUS is multiplexed with the one or more LP RS resources based on a multiplexing type. In some aspects, the multiplexing type corresponds to one of frequency division multiplexing or time division multiplexing. In some aspects, the network entity may transmit an indication representing the multiplexing type, where the indication is transmitted for the MR of the second network entity in at least one of SI, RRC signaling, a MAC-CE, or DCI (e.g., in configuration 708).

In some aspects, the LP WUS is quasi-co-located with a subset of the one or more LP RS resources based on a QCL type associated with a spatial receive parameter associated with beam information, and to receive the LP WUS, the UE may receive the LP WUS based on the spatial receive parameter. In some aspects, the LP WUS is associated with a first periodicity and the one or more LP RS resources is associated with a second periodicity, and where the one or more LP RS resources are associated with at least one monitoring occasion separate from the one or more monitoring occasions. In some aspects, the LP WUS is multiplexed with the one or more LP RS resources based on a multiplexing type. In some aspects, the multiplexing type corresponds to one of frequency division multiplexing or time division multiplexing. In some aspects, a second radio of the UE may receive an indication representing the multiplexing type, where the indication is received from the second network entity in at least one of SI, RRC signaling, a MAC-CE, or DCI (e.g., in configuration 708). In some aspects, the LP WUS is based on a set of REs and the LP RS is based on a first subset of the REs in the set of REs based on replacement in the first subset of the REs, or where the LP WUS is based on a second subset of REs in the set of REs and the LP RS is based on the first subset of the REs. In some aspects, the first configuration or the second configuration is at least one of a subcarrier spacing (SCS), a number of symbols or time units, a bandwidth (BW) (e.g., resource elements, resource blocks, block of resource blocks), waveform information, coding information, and modulation information.

At 1206, the network entity may refrain from transmitting a second LP RS based on the second LP RS being configured to be overlapping with a second LP WUS. For example, the network entity 704 may refrain from transmitting a second LP RS based on the second LP RS being configured to be overlapping with a second LP WUS. In some aspects, 1206 may be performed by LP RS component 199.

At 1208, the network entity may refrain from transmitting a second LP WUS based on the second LP WUS being configured to be overlapping with a second LP RS. For example, the network entity 704 may refrain from transmitting a second LP WUS based on the second LP WUS being configured to be overlapping with a second LP RS. In some aspects, 1208 may be performed by LP RS component 199.

Figure 13:
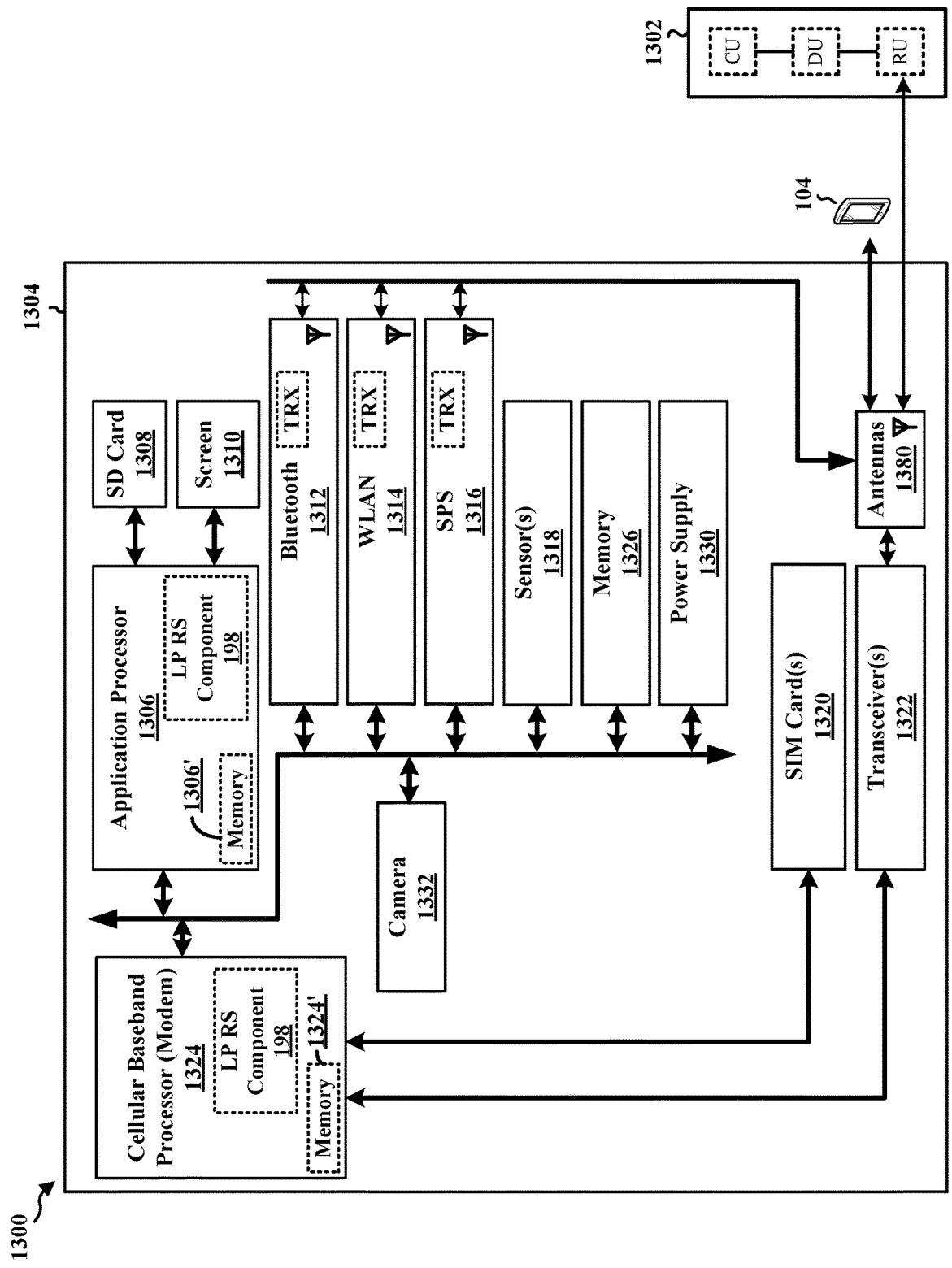
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, a satellite system module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the satellite system module 1316 may include an on-chip transceiver (TRX)/receiver (RX). The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described herein. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed herein, the LP RS component 198 may be configured to receive, from a second network entity, one or more LP reference signal (LP RS) resources, where the one or more LP RS resources are configured for at least one of: time or frequency tracking or synchronization, time or frequency error estimation or correction, radio resource management (RRM), or channel estimation. In some aspects, the LP RS component 198 may be further configured to receive (e.g., from the second network entity) a LP wake up signal (LP WUS) (e.g., via the antenna port) based on the one or more LP RS resources, where the LP WUS is associated with a paging indication, where the LP WUS is quasi-co-located with at least one of the one or more of configured LP RS resources, and where the LP WUS is associated with a first configuration and the at least one LP RS resource is associated with a second configuration. In some aspects, the LP RS component 198 may be further configured to cause, based on the LP WUS, the second radio to wake up from a power state. The LP RS component 198 may be within the cellular baseband processor 1324, the application processor 1306, or both the cellular baseband processor 1324 and the application processor 1306. The LP RS component 198 may be one or more hardware components specifically configured to carry out the stated processes/algorithm, implemented by one or more processors configured to perform the stated processes/algorithm, stored within a computer-readable medium for implementation by one or more processors, or some combination thereof, such as a LP WUR. As shown, the apparatus 1304 may include a variety of components configured for various functions. In one configuration, the apparatus 1304, and in particular the cellular baseband processor 1324 and/or the application processor 1306, includes means for receiving, from a second network entity, one or more LP reference signal (LP RS) resources, where the one or more LP RS resources are configured for at least one of: time or frequency tracking or synchronization, time or frequency error estimation or correction, radio resource management (RRM), or channel estimation. In some aspects, the apparatus 1304 includes means for receiving a LP wake up signal (LP WUS) based on the one or more LP RS resources, where the LP WUS is associated with one or more monitoring occasions, where the LP WUS is quasi-co-located with at least one of the one or more LP RS resources, and where the LP WUS is associated with a first configuration and the at least one LP RS resource is associated with a second configuration. In some aspects, the apparatus 1304 includes means for causing, based on the LP WUS, the second radio to wake up from a power state. In some aspects, the apparatus 1304 includes means for receiving the LP WUS based on the spatial receive parameter. In some aspects, the apparatus 1304 includes means for receiving an indication representing the multiplexing type in at least one of system information (SI), radio resource control (RRC) signaling, a medium access control (MAC) control element (MAC-CE), or downlink control information (DCI). In some aspects, the apparatus 1304 includes means for refraining from monitoring for a second LP RS based on the second LP RS overlapping with a second LP WUS. In some aspects, the apparatus 1304 includes means for refraining from monitoring for a second LP WUS based on the second LP WUS overlapping with a second LP RS. In some aspects, the apparatus 1304 includes means for receiving, from the second network entity, the LP RS configuration and the LP WUS configuration (e.g., based on a layer 1 (L1) signaling, a layer 2 (L2) signaling, or a layer 3 (L3) signaling). In some aspects, the apparatus 1304 includes means for receiving, from the second network entity, a LP configuration signal including the LP RS configuration and the LP WUS configuration, where the LP configuration signal is associated with a third periodicity. In some aspects, the apparatus 1304 includes means for receiving one or more parameters associated with the LP configuration signal including the third periodicity in at least one of system information (SI), radio resource control (RRC) signaling, a medium access control (MAC) control element (MAC-CE), or downlink control information (DCI). The means may be the LP RS component 198 of the apparatus 1304 configured to perform the functions recited by the means. As described herein, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
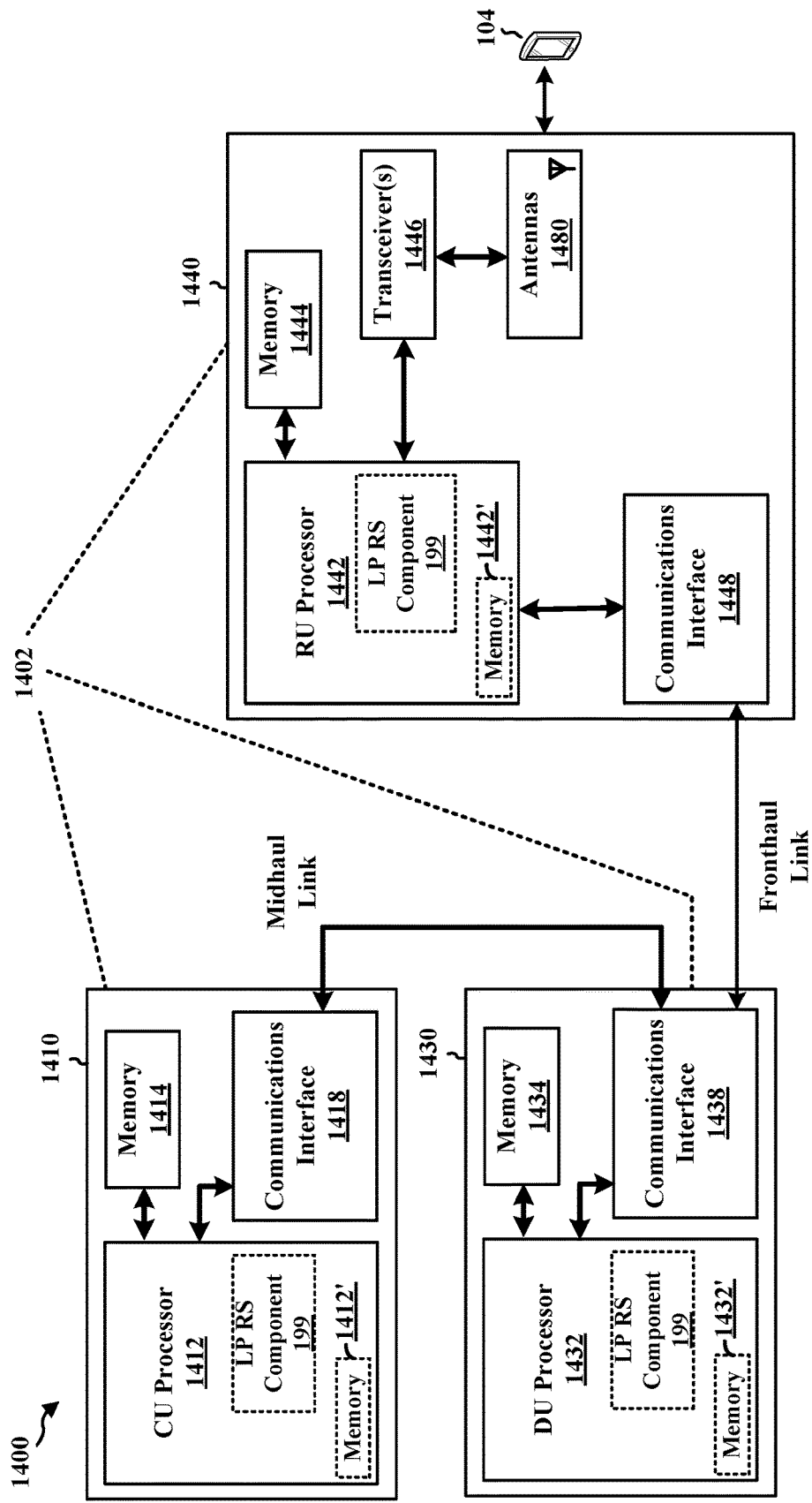
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the LP RS component 199 may be configured to transmit, to a second network entity (e.g., for a first radio of the second network entity), one or more LP reference signal (LP RS) resources, where the one or more LP RS resources are configured for at least one of: time or frequency tracking or synchronization, time or frequency error estimation or correction, radio resource management (RRM), or channel estimation. In some aspects, the LP RS component 199 may be further configured to transmit, to the second network entity, a LP wake up signal (LP WUS) based on the one or more LP RS resources, where the LP WUS is associated with one or more monitoring occasions of the second network entity, where the LP WUS is quasi-colocated with at least one of the one or more of configured LP RS resources, and where the LP WUS is associated with a first configuration and the at least one LP RS resource is associated with a second configuration. The LP RS component 199 may be within one or more processors of one or more of the CU 1410, DU 1430, and the RU 1440. The LP RS component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for transmitting, to a second network entity (e.g., for a first radio of the second network entity), one or more LP reference signal (LP RS) resources (e.g., via an antenna port), where the one or more LP RS resources are configured for at least one of: time or frequency tracking or synchronization, time or frequency error estimation or correction, radio resource management (RRM), or channel estimation. In some aspects, the network entity 1402 may further include means for transmitting, to the second network entity, a LP wake up signal (LP WUS) (e.g., via the antenna port) based on the one or more LP RS resources, where the LP WUS is associated with one or more monitoring occasions of the second network entity, where the LP WUS is quasi-co-located with at least one of the one or more of configured LP RS resources, and where the LP WUS is associated with a first configuration and the at least one LP RS resource is associated with a second configuration. In some aspects, the network entity 1402 may further include means for transmitting the LP WUS based on the spatial receive parameter. In some aspects, the network entity 1402 may further include means for transmitting an indication representing the multiplexing type, where the indication is transmitted for a second radio on the second network entity in at least one of system information (SI), radio resource control (RRC) signaling, a medium access control (MAC) control element (MAC-CE), or downlink control information (DCI). In some aspects, the network entity 1402 may further include means for refraining from transmitting a second LP RS based on the second LP RS overlapping with a second LP WUS. In some aspects, the network entity 1402 may further include means for refrain from transmitting a second LP WUS based on the second LP WUS overlapping with a second LP RS. In some aspects, the network entity 1402 may further include means for transmitting, for the LP WUR on the second network entity, a LP configuration signal including the LP RS configuration and the LP WUS configuration, where the LP configuration signal is associated with a third periodicity. In some aspects, the network entity 1402 may further include means for transmitting one or more parameters associated with the LP configuration signal including the third periodicity, where the one or more parameters are transmitted for the MR on the second network entity in at least one of system information (SI), radio resource control (RRC) signaling, a medium access control (MAC) control element (MAC-CE), or downlink control information (DCI). The means may be the LP RS component 199 of the network entity 1402 configured to perform the functions recited by the means. As described herein, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a first network entity for wireless communication, including: a first radio; and a second radio coupled to the first radio, where the first radio is configured to: receive, from a second network entity, one or more LP reference signal (LP RS) resources, where the one or more LP RS resources are configured for at least one of: time or frequency tracking or synchronization, time or frequency error estimation or correction, radio resource management (RRM), or channel estimation; and receive (e.g., from the second network entity) a LP wake up signal (LP WUS) based on the one or more LP RS resources, where the LP WUS is associated with one or more monitoring occasions, where the LP WUS is quasi-co-located with at least one of the one or more LP RS resources, and where the LP WUS is associated with a first configuration and the at least one LP RS resource is associated with a second configuration; and cause, based on the LP WUS, the second radio to wake up from a power state.

Aspect 2 is the first network entity of aspect 1, where the first configuration is at least one of a first subcarrier spacing (SCS), a first number (e.g., quantity) of symbols or time units, a first bandwidth (BW), first waveform information, first coding information, or first modulation information; and where the second configuration is at least one of a second subcarrier spacing (SCS), a second number (e.g., quantity) of symbols or time units, a second bandwidth (BW), second waveform information, second coding information, or second modulation information. In some aspects, the first configuration is a first SCS and the second configuration is a second SCS, the first SCS being different from the second SCS. In some aspects, the first configuration is a first number (e.g., quantity) of symbols or time units and the second configuration is a second number (e.g., quantity) of symbols or time units, the first number of symbols or time units being different from the second number of symbols or time units. In some aspects, the first configuration is a first BW and the second configuration is a second BW, the first BW being different from the second BW. In some aspects, the first configuration is a first wave information and the second configuration is a second wave information, the first wave information being different from the second wave information. In some aspects, the first configuration is a first coding information and the second configuration is a second coding information, the first coding information being different from the second coding information. In some aspects, the first configuration is a first modulation information and the second configuration is a second modulation information, the first modulation information being different from the second modulation information.

Aspect 3 is the first network entity of any of aspects 1-2, where the one or more LP RS resources are based on an on-off keying (OOK) waveform that represents reference signal or sequence signal based on a presence or an absence of a wave.

Aspect 4 is the first network entity of any of aspects 1-3, where the one or more LP RS resources correspond to one or more LP RS resource sets.

Aspect 5 is the first network entity of any of aspects 1-4, where the one or more LP RS resources are based on an orthogonal frequency division multiplexing (OFDM) waveform.

Aspect 6 is the first network entity of any of aspects 1-5, where the one or more LP RS resources are associated with a periodicity.

Aspect 7 is the first network entity of any of aspects 1-6, where the LP WUS is quasi-co-located with a subset of the one or more LP RS resources, based on a quasi-co-location (QCL) type associated with a spatial receive parameter associated with beam information, where to receive the LP WUS, the first radio is configured to: receive the LP WUS based on the spatial receive parameter.

Aspect 8 is the first network entity of any of aspects 1-7, where the LP WUS is associated with a first periodicity and the one or more LP RS resources are associated with a second periodicity, and where the one or more LP RS resources are associated with at least one monitoring occasion separate from the one or more monitoring occasions.

Aspect 9 is the first network entity of any of aspects 1-8, where the LP WUS is multiplexed with the one or more LP RS resources based on a multiplexing type.

Aspect 10 is the first network entity of any of aspects 1-9, where the multiplexing type corresponds to one of frequency division multiplexing or time division multiplexing.

Aspect 11 is the first network entity of any of aspects 1-10, where the second radio is configured to: receive an indication representing the multiplexing type in at least one of system information (SI), radio resource control (RRC) signaling, a medium access control (MAC) control element (MAC-CE), or downlink control information (DCI).

Aspect 12 is the first network entity of any of aspects 1-11, where the first radio is configured to: refrain from monitoring for a second LP RS based on the second LP RS overlapping with a second LP WUS.

Aspect 13 is the first network entity of any of aspects 1-12, where the first radio is configured to: refrain from monitoring for a second LP WUS based on the second LP WUS overlapping with a second LP RS.

Aspect 14 is the first network entity of any of aspects 1-13, where the first configuration is a LP WUS configuration associated with a first set of sequences, a first periodicity, or a first set of time and frequency resources, where the second configuration is a LP RS configuration associated with a second set of sequences, a second periodicity, or a second set of time and frequency resources, and where the first radio or the second radio is configured to: receive, from the second network entity, the LP RS configuration and the LP WUS configuration (e.g., based on a layer 1 (L1) signaling, a layer 2 (L2) signaling, or a layer 3 (L3) signaling).

Aspect 15 is the first network entity of any of aspects 1-14, where to receive the LP RS configuration and the LP WUS configuration, the first radio is configured to: receive, from the second network entity, a LP configuration signal including the LP RS configuration and the LP WUS configuration, where the LP configuration signal is associated with a third periodicity.

Aspect 16 is the first network entity of any of aspects 1-15, where the second radio is configured to: receive one or more parameters associated with the LP configuration signal including the third periodicity in at least one of system information (SI), radio resource control (RRC) signaling, a medium access control (MAC) control element (MAC-CE), or downlink control information (DCI).

Aspect 17 is the first network entity of any of aspects 1-16, where the LP WUS is based on a set of resource elements (REs) and the one or more LP RS resources are based on a first subset of the REs in the set of REs based on replacement in the first subset of the REs, or where the LP WUS is based on a second subset of REs in the set of REs and the one or more LP RS resources are based on the first subset of the REs.

Aspect 18 is the first network entity of any of aspects 1-17, where the first radio is a low power wake up radio and the second radio is a main radio.

Aspect 19 is the first network entity of any of aspects 1-18, where the second radio includes the first radio.

Aspect 20 is the first network entity of any of aspects 1-19, where the first radio and the second radio are separate components.

Aspect 21 is the first network entity of any of aspects 1-20, where at least one of the first configuration and the second configuration is based on a radio resource control (RRC) state of the first network entity.

Aspect 22 is the first network entity of any of aspects 1-21, where the first configuration is a LP WUS configuration and associated with a first set of sequences, a first periodicity, or a first set of time and frequency resources, and where the second configuration is a LP RS configuration and associated with a second set of sequences, a second periodicity, or a second set of time and frequency resources.

Aspect 23 is the first network entity of any of aspects 1-22, where the first radio or the second radio is configured to receive, from the second network entity, the LP WUS configuration and the LP RS configuration.

Aspect 24 is the first network entity of any of aspects 1-23, where to receive the LP RS configuration and the LP WUS configuration, the first radio is configured to receive, from the second network entity, a LP configuration signal including the LP WUS configuration and the LP RS configuration.

Aspect 25 is a first network entity for wireless communication, including: a memory; and at least one processor coupled to the memory, where the at least one processor is configured to: transmit, to a second network entity, one or more LP reference signal (LP RS) resources, where the one or more LP RS resources are configured for at least one of: time or frequency tracking or synchronization, time or frequency error estimation or correction, radio resource management (RRM), or channel estimation; and transmit, to the second network entity, a LP wake up signal (LP WUS) based on the one or more LP RS resources, where the LP WUS is associated with one or more monitoring occasions of the second network entity, where the LP WUS is quasi-co-located with at least one of the one or more of configured LP RS resources, and where the LP WUS is associated with a first configuration and the at least one LP RS resource is associated with a second configuration.

Aspect 26 is the first network entity of aspect 25, where the first configuration is at least one of a first subcarrier spacing (SCS), a first number (e.g., quantity) of symbols or time units, a first bandwidth (BW), first waveform information, first coding information, or first modulation information; and where the second configuration is at least one of a second subcarrier spacing (SCS), a second number (e.g., quantity) of symbols or time units, a second bandwidth (BW), second waveform information, second coding information, or second modulation information. In some aspects, the first configuration is a first SCS and the second configuration is a second SCS, the first SCS being different from the second SCS. In some aspects, the first configuration is a first number (e.g., quantity) of symbols or time units and the second configuration is a second number (e.g., quantity) of symbols or time units, the first number of symbols or time units being different from the second number of symbols or time units. In some aspects, the first configuration is a first BW and the second configuration is a second BW, the first BW being different from the second BW. In some aspects, the first configuration is a first wave information and the second configuration is a second wave information, the first wave information being different from the second wave information. In some aspects, the first configuration is a first coding information and the second configuration is a second coding information, the first coding information being different from the second coding information. In some aspects, the first configuration is a first modulation information and the second configuration is a second modulation information, the first modulation information being different from the second modulation information.

Aspect 27 is the first network entity of any of aspects 25-26, where the one or more LP RS resources are based on an on-off keying (OOK) waveform that represents reference signal or sequence signal based on a presence or an absence of a wave Aspect 28 is the first network entity of any of aspects 25-27, where the one or more LP RS resources correspond to one or more LP RS resource sets.

Aspect 29 is the first network entity of any of aspects 25-28, where the one or more LP RS resources are based on an orthogonal frequency division multiplexing (OFDM) waveform.

Aspect 30 is the first network entity of any of aspects 25-29, where the one or more LP RS resources are associated with a periodicity.

Aspect 31 is the first network entity of any of aspects 25-30, where the LP WUS is quasi-co-located with a subset of the one or more LP RS resources based on a quasi-co-location (QCL) type associated with a spatial receive parameter associated with beam information, where to transmit the LP WUS, the at least one processor is configured to: transmit the LP WUS based on the spatial receive parameter.

Aspect 32 is the first network entity of any of aspects 25-31, where the LP WUS is associated with a first periodicity and the one or more LP RS resources are associated with a second periodicity, and where the one or more LP RS resources are associated with at least one monitoring occasion separate from the one or more monitoring occasions.

Aspect 33 is the first network entity of any of aspects 25-32, where the LP WUS is multiplexed with the one or more LP RS resources based on a multiplexing type.

Aspect 34 is the first network entity of any of aspects 31-33, where the multiplexing type corresponds to one of frequency division multiplexing or time division multiplexing.

Aspect 35 is the first network entity of any of aspects 31-34, where the at least one processor is configured to: transmit an indication representing the multiplexing type, where the indication is transmitted for a second radio on the second network entity in at least one of system information (SI), radio resource control (RRC) signaling, a medium access control (MAC) control element (MAC-CE), or downlink control information (DCI).

Aspect 36 is the first network entity of any of aspects 25-35, where the at least one processor is configured to: refrain from transmitting a second LP RS based on the second LP RS overlapping with a second LP WUS.

Aspect 37 is the first network entity of any of aspects 25-36, where the at least one processor is configured to: refrain from transmitting a second LP WUS based on the second LP WUS overlapping with a second LP RS.

Aspect 38 is the first network entity of any of aspects 25-37, where with the first configuration is a LP WUS configuration associated with a first set of sequences, a first periodicity, or a first set of time and frequency resources, where the second configuration is a LP RS configuration associated with a second set of sequences, a second periodicity, or a second set of time and frequency resources, and where the at least one processor is configured to: transmit, for the LP WUR on the second network entity, the LP RS configuration and the LP WUS configuration. In some aspects, at least one of the first configuration and the second configuration is based on a RRC state of the first network entity.

Aspect 39 is the first network entity of any of aspects 25-38, where to transmit the LP RS configuration and the LP WUS configuration, the at least one processor is configured to: transmit, for the LP WUR on the second network entity, a LP configuration signal including the LP RS configuration and the LP WUS configuration, where the LP configuration signal is associated with a third periodicity.

Aspect 40 is the first network entity of any of aspects 25-39, where the at least one processor is configured to: transmit one or more parameters associated with the LP configuration signal including the third periodicity, where the one or more parameters are transmitted for the MR on the second network entity in at least one of system information (SI), radio resource control (RRC) signaling, a medium access control (MAC) control element (MAC-CE), or downlink control information (DCI).

Aspect 41 is the first network entity of any of aspects 25-40, where the LP WUS is based on a set of resource elements (REs) and the one or more LP RS resources are based on a first subset of the REs in the set of REs based on replacement in the first subset of the REs, or where the LP WUS is based on a second subset of REs in the set of REs and the one or more LP RS resources are based on the first subset of the REs.

Aspect 42 is the first network entity of any of aspects 25-41, where the at least one processor is configured to receive, from the second network entity, first information after transmission of the LP RS resources and the LP WUS or transmit, to the second network entity, second information after transmission of the LP RS resources and the LP WUS.

Aspect 43 is the first network entity of any of aspects 25-42, where the at least one processor is configured to cause a first radio of the second network entity to wake up a second radio of the second network entity from a power state.

Aspect 44 is the first network entity of any of aspects 25-43, where the at least one processor is configured to receive, from the second network entity, first information after transmission of the LP RS resources and the LP WUS or transmit, to the second network entity, information after transmission of the LP RS resources and the LP WUS.

Aspect 45 is a method of wireless communication for implementing any of aspects 1 to 24.

Aspect 46 is an apparatus for wireless communication including means for implementing any of aspects 1 to 24.

Aspect 47 is a computer-readable medium (e.g., a non-transitory computer-readable medium) storing computer executable code, where the code when executed by a processor causes the processor to implement any of aspects 1 to 24.

Aspect 48 is a method of wireless communication for implementing any of aspects 25 to 45.

Aspect 49 is an apparatus for wireless communication including means for implementing any of aspects 25 to 45.

Aspect 50 is a computer-readable medium (e.g., a non-transitory computer-readable medium) storing computer executable code, where the code when executed by a processor causes the processor to implement any of aspects 25 to 45.

What is claimed is:

1. A first network entity for wireless communication, comprising:
   a first radio; and
   a second radio coupled to the first radio, wherein the first radio is configured to:
      receive, from a second network entity, one or more low power reference signal (LP RS) resources, wherein the one or more LP RS resources are configured for at least one of: time or frequency tracking or synchronization, time or frequency error estimation or correction, radio resource management (RRM), or channel estimation;
      receive a LP wake up signal (LP WUS) based on the one or more LP RS resources, wherein the LP WUS is associated with one or more monitoring occasions, wherein the LP WUS is quasi-co-located with at least one of the one or more LP RS resources, and wherein the LP WUS is associated with a first configuration and the at least one LP RS resource is associated with a second configuration; and
      cause, based on the LP WUS, the second radio to wake up from a power state.

2. The first network entity of claim 1,
   wherein the first configuration is at least one of a first subcarrier spacing (SCS), a first number of symbols or time units, a first bandwidth (BW), first waveform information, first coding information, or first modulation information; and
   wherein the second configuration is at least one of a second subcarrier spacing (SCS), a second number of symbols or time units, a second bandwidth (BW), second waveform information, second coding information, or second modulation information.

3. The first network entity of claim 1, wherein the one or more LP RS resources are based on an on-off keying (OOK) waveform that represents reference signal or sequence signal based on a presence or an absence of a wave.

4. The first network entity of claim 1, wherein the one or more LP RS resources correspond to one or more LP RS resource sets.

5. The first network entity of claim 1, wherein the one or more LP RS resources are based on an orthogonal frequency division multiplexing (OFDM) waveform.

6. The first network entity of claim 1, wherein the one or more LP RS resources are associated with a periodicity.

7. The first network entity of claim 1, wherein the LP WUS is quasi-co-located with a subset of the one or more LP RS resources, based on a quasi-co-location (QCL) type associated with a spatial receive parameter associated with beam information, wherein to receive the LP WUS, the first radio is configured to:
   receive the LP WUS based on the spatial receive parameter.

8. The first network entity of claim 1, wherein the LP WUS is associated with a first periodicity and the one or more LP RS resources are associated with a second periodicity, and wherein the one or more LP RS resources are associated with at least one monitoring occasion separate from the one or more monitoring occasions.

9. The first network entity of claim 1, wherein the LP WUS is multiplexed with the one or more LP RS resources based on a multiplexing type.

10. The first network entity of claim 9, wherein the multiplexing type corresponds to one of frequency division multiplexing or time division multiplexing.

11. The first network entity of claim 10, wherein the second radio is configured to:
receive an indication representing the multiplexing type in at least one of system information (SI), radio resource control (RRC) signaling, a medium access control (MAC) control element (MAC-CE), or downlink control information (DCI).

12. The first network entity of claim 1, wherein the first radio is configured to:
refrain from monitoring for a second LP RS based on the second LP RS overlapping with a second LP WUS.

13. The first network entity of claim 1, wherein the first radio is configured to:
refrain from monitoring for a second LP WUS based on the second LP WUS overlapping with a second LP RS.

14. The first network entity of claim 1, wherein the first configuration is a LP WUS configuration associated with a first set of sequences, a first periodicity, or a first set of time and frequency resources, wherein the second configuration is a LP RS configuration associated with a second set of sequences, a second periodicity, or a second set of time and frequency resources, and wherein the first radio or the second radio is configured to:
receive, from the second network entity, the LP RS configuration and the LP WUS configuration.

15. The first network entity of claim 14, wherein to receive the LP RS configuration and the LP WUS configuration, the first radio is configured to:
receive, from the second network entity, a LP configuration signal comprising the LP RS configuration and the LP WUS configuration, wherein the LP configuration signal is associated with a third periodicity.

16. The first network entity of claim 15, wherein the second radio is configured to:
receive one or more parameters associated with the LP configuration signal including the third periodicity in at least one of system information (SI), radio resource control (RRC) signaling, a medium access control (MAC) control element (MAC-CE), or downlink control information (DCI).

17. The first network entity of claim 1, wherein the LP WUS is based on a set of resource elements (REs) and the one or more LP RS resources are based on a first subset of the REs in the set of REs based on replacement in the first subset of the REs, or wherein the LP WUS is based on a second subset of REs in the set of REs and the one or more LP RS resources is based on the first subset of the REs.

18. The first network entity of claim 1, wherein the first radio is a low power wake up radio and the second radio is a main radio.

19. The first network entity of claim 1, wherein the second radio includes the first radio.

20. The first network entity of claim 1, wherein the first radio and the second radio are separate components.

21. The first network entity of claim 1, wherein at least one of the first configuration and the second configuration is based on a radio resource control (RRC) state of the first network entity.

22. The first network entity of claim 21, wherein the first configuration is a LP WUS configuration and associated with a first set of sequences, a first periodicity, or a first set of time and frequency resources, and wherein the second configuration is a LP RS configuration and associated with a second set of sequences, a second periodicity, or a second set of time and frequency resources.

23. The first network entity of claim 21, wherein the first radio or the second radio is configured to:
receive, from the second network entity, the LP WUS configuration and the LP RS configuration.

24. The first network entity of claim 23, wherein to receive the LP RS configuration and the LP WUS configuration, the first radio is configured to:
receive, from the second network entity, a LP configuration signal comprising the LP WUS configuration and the LP RS configuration.

25. A first network entity for wireless communication, comprising:
a memory; and
at least one processor coupled to the memory, wherein the at least one processor is configured to:
transmit, to a second network entity, one or more low power reference signal (LP RS) resources, wherein the one or more LP RS resources are configured for at least one of: time or frequency tracking or synchronization, time or frequency error estimation or correction, radio resource management (RRM), or channel estimation; and
transmit, to the second network entity, a LP wake up signal (LP WUS) based on the one or more LP RS resources, wherein the LP WUS is associated with one or more monitoring occasions of the second network entity, wherein the LP WUS is quasi-co-located with at least one of the one or more of configured LP RS resources, and wherein the LP WUS is associated with a first configuration and the at least one LP RS resource is associated with a second configuration.

26. The first network entity of claim 25,
wherein the first configuration is at least one of a first subcarrier spacing (SCS), a first number of symbols or time units, a first bandwidth (BW), first waveform information, first coding information, or first modulation information; and
wherein the second configuration is at least one of a second subcarrier spacing (SCS), a second number of symbols or time units, a second bandwidth (BW), second waveform information, second coding information, or second modulation information.

27. The first network entity of claim 25, wherein the one or more LP RS resources are based on an on-off keying (OOK) waveform that represents reference signal or sequence signal based on a presence or an absence of a wave.

28. The first network entity of claim 25, wherein the one or more LP RS resources correspond to one or more LP RS resource sets.

29. The first network entity of claim 25, wherein the one or more LP RS resources are based on an orthogonal frequency division multiplexing (OFDM) waveform.

30. The first network entity of claim 25, wherein the one or more LP RS resources are associated with a periodicity.

31. The first network entity of claim 25, wherein the LP WUS is quasi-co-located with a subset of the one or more LP RS resources based on a quasi-co-location (QCL) type associated with a spatial receive parameter associated with beam information, wherein to transmit the LP WUS, the at least one processor is configured to:
transmit the LP WUS based on the spatial receive parameter.

32. The first network entity of claim 25, wherein the LP WUS is associated with a first periodicity and the one or more LP RS resources are associated with a second periodicity, and wherein the one or more LP RS resources are associated with at least one monitoring occasion separate from the one or more monitoring occasions.

33. The first network entity of claim 25, wherein the at least one processor is configured to:
receive, from the second network entity, first information after transmission of the LP RS resources and the LP WUS; or
transmit, to the second network entity, second information after transmission of the LP RS resources and the LP WUS.

34. The first network entity of claim 25, wherein the LP WUS is configured to:
cause a first radio of the second network entity to wake up a second radio of the second network entity from a power state.

35. The first network entity of claim 34, wherein the at least one processor is configured to:
receive, from the second network entity, first information after transmission of the LP RS resources and the LP WUS; or
transmit, to the second network entity, second information after transmission of the LP RS resources and the LP WUS.

36. A method of wireless communication performed by a first network entity, comprising:
receiving, from a second network entity, one or more low power reference signal (LP RS) resources, wherein the one or more LP RS resources are configured for at least one of: time or frequency tracking or synchronization, time or frequency error estimation or correction, radio resource management (RRM), or channel estimation;
receiving a LP wake up signal (LP WUS) based on the one or more LP RS resources, wherein the LP WUS is associated with one or more monitoring occasions, wherein the LP WUS is quasi-co-located with at least one of the one or more LP RS resources, and wherein the LP WUS is associated with a first configuration and the at least one LP RS resource is associated with a second configuration; and
causing, based on the LP WUS, a second radio to wake up from a power state.

37. A method of wireless communication performed by a first network entity, comprising:
transmitting, to a second network entity, one or more low power reference signal (LP RS) resources, wherein the one or more LP RS resources are configured for at least one of: time or frequency tracking or synchronization, time or frequency error estimation or correction, radio resource management (RRM), or channel estimation; and
transmitting, to the second network entity, a LP wake up signal (LP WUS) based on the one or more LP RS resources, wherein the LP WUS is associated with one or more monitoring occasions of the second network entity, wherein the LP WUS is quasi-co-located with at least one of the one or more of configured LP RS resources, and wherein the LP WUS is associated with a first configuration and the at least one LP RS resource is associated with a second configuration.

* * * * *